(12) United States Patent
Usui

(10) Patent No.: US 8,508,823 B2
(45) Date of Patent: Aug. 13, 2013

(54) IMAGE PROCESSING METHOD, IMAGE PROCESSING APPARATUS, IMAGE FORMING APPARATUS, AND RECORDING MEDIUM

(75) Inventor: Daisuke Usui, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1539 days.

(21) Appl. No.: 12/057,230

(22) Filed: Mar. 27, 2008

(65) Prior Publication Data

US 2008/0239354 A1 Oct. 2, 2008

(30) Foreign Application Priority Data

Mar. 28, 2007 (JP) ................... 2007-085875
Sep. 12, 2007 (JP) ................... 2007-236706

(51) Int. Cl.
*H04N 1/60* (2006.01)
*H04N 1/62* (2006.01)
*H04N 1/00* (2006.01)
*H04N 1/40* (2006.01)
*G06F 15/00* (2006.01)
*G06K 15/02* (2006.01)
*G06K 9/46* (2006.01)
*G03F 3/00* (2006.01)

(52) U.S. Cl.
USPC ............. 358/538; 358/1.9; 358/2.1; 358/501; 358/518; 358/530; 358/401; 358/448; 382/190; 382/192; 382/194; 382/271

(58) Field of Classification Search
None
See application file for complete search history.

(56) References Cited

U.S. PATENT DOCUMENTS

| 5,282,026 | A | 1/1994 | Nagata et al. | |
|---|---|---|---|---|
| 6,415,064 | B1 * | 7/2002 | Oh | 382/289 |
| 6,798,540 | B1 * | 9/2004 | Kritayakirana et al. | 358/1.9 |
| 2004/0141208 | A1 * | 7/2004 | Park | 358/3.26 |
| 2006/0139492 | A1 * | 6/2006 | Ahn et al. | 348/558 |
| 2007/0154112 | A1 * | 7/2007 | Tanaka | 382/284 |
| 2008/0055620 | A1 * | 3/2008 | Usui et al. | 358/1.9 |

FOREIGN PATENT DOCUMENTS

| JP | 4-282968 A | 10/1992 |
|---|---|---|
| JP | 2000-172850 A | 6/2000 |
| JP | 2001-36752 A | 2/2001 |
| JP | 2002-125121 A | 4/2002 |
| JP | 2002-165054 * | 6/2002 |
| JP | 2005-45373 A | 2/2005 |

* cited by examiner

*Primary Examiner* — King Poon
*Assistant Examiner* — Beniyam Menberu
(74) *Attorney, Agent, or Firm* — Birch, Stewart, Kolasch & Birch, LLP

(57) ABSTRACT

An available image area is recognized from information, including a read start position and a read end position of a document, a scaling for performing image processing, a processing object position, or the like. Subsequently, the number of chromatic pixels of one line is counted to output it to a memory, and when it is summed up to an end line of the available image area, a difference between a count number N1 in one previous line of the available image area and a count number N2 in the end line of the available image area is calculated to thereby compare the difference with a predetermined threshold value. When the difference is larger than the threshold, it is determined to be a chromatic image, whereas when the difference is smaller than the threshold, it is determined to be an achromatic image.

14 Claims, 31 Drawing Sheets

ACS PROCESS IS PERFORMED TO THE PART OF DOCUMENT.

IMAGE PROCESSING METHOD, IMAGE PROCESSING APPARATUS, IMAGE FORMING APPARATUS, AND RECORDING MEDIUM

CROSS-REFERENCE TO RELATED APPLICATIONS

This Nonprovisional application claims priority under 35 U.S.C. Section 119(a) on Patent Application No. 2007-85875 and No. 2007-236706 filed in Japan on Mar. 28, 2007 and Sep. 12, 2007 respectively, the entire contents of which are hereby incorporated by reference.

BACKGROUND

1. Technical Field

The present application relates to an image processing method, an image processing apparatus, an image forming apparatus, and a recording medium, in which classifications of pixels are discriminated per line and image processing is performed thereto.

2. Description of the Related Art

In image forming apparatuses, such as digital copying machines and multi-function printers, in order to perform image processing with an image processing method suitable for each individual read documents, auto color selection processing (hereinafter, it will be described as ACS processing) to determine whether these documents are chromatic documents or achromatic documents is often performed (refer to, for example, Japanese Patent Application Laid Open No. H4-282968).

In the conventional art, whether a chromatic pixel or an achromatic pixel is discriminated for each pixel, and then when presence of successive chromatic pixels more than a predetermined number is detected in the order of given pixels, the amount of pixels of the successive chromatic pixels is recognized as a chromatic block, and when there are chromatic blocks more than a predetermined number in one line, the line is counted as a chromatic line. Subsequently, when there are chromatic lines as many as a predetermined number in the document, it has been determined as a chromatic image, and when not, it has been determined as an achromatic image.

Since such ACS processing may give different results between cases of performing it to a whole area of the read document and to a partial area thereof it is preferable to perform the ACS processing only to an available image area corresponding to an image area to be outputted.

FIG. 1 and FIG. 2 are explanatory views illustrating examples in which determination results are different depending on the available image areas. FIG. 1 is an example when the ACS processing is performed to the whole document with respect to a document which has achromatic pixels and chromatic pixels. It has chromatic pixels at a rate equal to a determination criterion or more with respect to the pixel count in the whole document, so it is determined as a chromatic document. While a document shown in FIG. 2 is the same document as the document shown in FIG. 1, it is an example when the ACS processing is performed only to a left half area. Although it has chromatic pixels as the whole document, it is determined as an achromatic document since there are not chromatic pixels in the available image area at the rate equal to the determination criterion or more.

Similarly, there are document determination processing and undercolor recognition processing as image recognition processing performed only to the available image area to be outputted. There is a method in which when the document determination processing is performed to the document read from a scanner, pre-scan is performed to calculated a mean value of a difference between the numbers of pixels in a high density portion up to rising and falling, and the number of pixels in a low density portion from falling to rising with respect to line image data in the available image area, and features called a sum of a mean value of a difference between the numbers of pixels in the adjacent low density portions is calculated to thereby determine whether or not it is a text pixel, and then when there are text pixels at a rate equal to a threshold or more with respect to a total number of pixels in the area, it is recognized as a text document, and if not, as a photograph document or the like (refer to Japanese Patent Application Laid Open No. 2002-125121).

However, both of the ACS determination processing described in Patent Document 1 and the document discrimination processing described in Patent Document 2 are processing assuming that the document is put on a scanner platen, and image data of the whole document is read to then perform an ACS determination and a document type determination. For example, considering a case where the document is read per line by an automatic document feeder, there are problems that the available image area of the document is fixed when the back-end of the document is detected, and thus the ACS processing or the document type determination cannot be started before the whole document is once read and the available image area is fixed.

FIG. 3 is an explanatory view illustrating processing when the document is read per line by the automatic document feeder. When the document is read by a line scanner provided with an automatic document feeder, a back end position and a specific pixel width y are required in order to set an area CDEF with an area equal to the specific pixel width y from the back end with respect to a sub-scanning direction of the scan as an available image area. Since the width y is calculated from an output image size, a scaling, or the like, it can be fixed before the document is read. However, the area CDEF cannot be fixed until the back end of the document is detected by a document end detecting sensor of the line scanner. Namely, there are problems that it is necessary to store data read at least by the time when the back end is fixed, in a memory or the like, and to read the image data gain from the memory after it is fixed to then perform the ACS processing only to the available image area.

SUMMARY

The present application has been made in view of the situation described above, and an object thereof is to provide an image processing method, an image processing apparatus, and an image forming apparatus, which can start recognition processing without storing pre-scan and image data in a memory by configuring that a difference between features calculated from respective lines just in front of and at the back end of a set area is calculated, and a classification of the area is discriminated based on the calculated difference to then perform processing thereto according to the discrimination result, and a recording medium on which a computer program for achieving the aforementioned image processing method is recorded.

An image processing method for discriminating a classification of an image and performing processing according to a discrimination result in accordance with the present application is characterized by comprising the steps of: sequentially reading an image for discrimination into a memory for each line composed of a plurality of pixels; calculating features of the pixels in the read line; discriminating a classification of the pixels based on the calculated features and counting the pixels whose classifications are discriminated; setting an area to be processed with respect to the image; calculating a difference between the numbers of pixels whose classifications are discriminated, the numbers being calculated from a line just before the set area and an end line thereof, respectively; discriminating a classification of said area based on the calculated difference; and performing processing according to a discrimination result to the image in said area.

According to the present application, even if a sub-scanning direction size of the image is unknown at the time of input start of the image data, the start of the recognition processing is achieved without storing the prescan and image data in the memory. Additionally, when the discrimination result corresponding to the image area set after the image size is fixed (at image data input completion) are re-summed, the processing amount in accordance with the re-sum processing is reduced as compared with a case of storing the summed result of only corresponding line for each line.

An image processing method for discriminating a classification of an image and performing processing according to a discrimination result in accordance with the present application is characterized by comprising the steps of: sequentially reading an image for discrimination into a memory for each line composed of a plurality of pixels; calculating features of the pixels in the read line; discriminating a classification of the pixel based on the calculated features and counting the pixels whose classifications are discriminated, for each column divided in a main scanning direction; setting an area to be processed with respect to the image; calculating a difference between the numbers of pixels whose classifications are discriminated for each column included in the set area, the numbers being calculated from a line just before the set area and an end line thereof, respectively; discriminating a classification of said area based on a total sum of the calculated difference for each column; and performing processing according to a discrimination result to the image in said area.

In the present application, the area is divided also in the main scanning direction to determine the discrimination result, and thus when the available image area is changed to then perform the processing again using the stored image data after storing the image data in a hard disk or the like (for example, when the frame erasure processing is performed), the recognition processing to the newly set available image area can be performed.

An image processing method for discriminating a classification of an image and performing processing according to a discrimination result in accordance with the present application is characterized by comprising the steps of: sequentially reading an image for discrimination into a memory for each line composed of a plurality of pixels; calculating features of the pixels in the read line; discriminating a classification of the pixel based on the calculated features and counting the pixels whose classifications are discriminated, for each of available image areas set in advance in a main scanning direction; setting an area to be processed with respect to the image; calculating a difference between the numbers of pixels whose classifications are discriminated with respect to a counting result corresponding to the set area, the numbers being calculated from a line just before the set area and an end line thereof, respectively; discriminating a classification of said area based on a total sum of the calculated difference; and performing processing according to a discrimination result to the image in said area.

In the present application, when the number of available image areas is lower than the required number of columns, the memory amount required for storing the counting result can be reduced.

An image processing apparatus for discriminating a classification of an image and performing processing according to a discrimination result in accordance with the present application is characterized by comprising: a read section for sequentially reading an image for discrimination for each line composed of a plurality of pixels; a classification discrimination section for calculating features of the pixels in the read line and discriminating a classification of the pixel based on the calculated features; a count section for counting the pixels whose classifications are discriminated; an area setting section for setting an area to be processed with respect to said image; a difference calculation section for calculating a difference between the numbers of pixels whose classifications are discriminated, the numbers being calculated from a line just before the set area and an end line thereof, respectively; a feature discrimination section for discriminating a feature of said area based on the calculated difference; and an image processing section for performing processing to the image in said area according to a discrimination result obtained from the feature discrimination section.

In the present application, even if the size in the sub-scanning direction of the image is unknown at start of the image data input, the recognition processing can be started without storing pre-scan and image data in the memory. Moreover, when the discrimination result corresponding to the image area set after the image size is fixed (at image data input completion) are re-summed, the processing amount in accordance with the re-sum processing is reduced as compared with a case of storing the summed result of only corresponding line for each line.

An image processing apparatus for discriminating a classification of an image and performing processing according to a discrimination result in accordance with the present application is characterized by comprising: a read section for sequentially reading an image for discrimination for each line composed of a plurality of pixels; a classification discrimination section for calculating features of the pixels in the read line and discriminating a classification of the pixel based on the calculated features; a count section for counting the pixels whose classifications are discriminated for each column divided in a main scanning direction; an area setting section for setting an area to be processed with respect to said image; a difference calculation section for calculating a difference between the numbers of pixels whose classifications are discriminated for each column included in the set area, the numbers being calculated from a line just before the set area and an end line thereof, respectively; a feature discrimination section for discriminating a feature of said set area based on a total sum of the calculated difference for each column; and an image processing section for performing processing to the image in said set area according to a discrimination result obtained from the feature discrimination section.

In the present application, the area is divided also in the main scanning direction to determine the discrimination result, and thus when the available image area is changed to then perform the processing again using the stored image data after storing the image data in a hard disk or the like (for example, when the frame erasure processing is performed), the recognition processing to the newly set available image area can be performed.

The image processing apparatus in accordance with the present application is characterized in that respective features with respect to a plurality of areas are discriminated by said feature discrimination section, discrimination results discriminated with respect to said plurality of areas are stored in a memory, respectively, and processing according to the discrimination result is performed to the image in each area.

In the present application, the discrimination result with respect to the available image area is determined to then store only the discrimination result, so that the data amount can be reduced as compared with a case of storing the number of pixels discriminated per line.

An image processing apparatus for discriminating a classification of an image and performing processing according to a discrimination result in accordance with the present application is characterized by comprising: a read section for sequentially reading an image for discrimination for each line composed of a plurality of pixels; a classification discrimination section for calculating features of the pixels in the read line and discriminating a classification of the pixel based on the calculated features; a count section for counting the pixels whose classifications are discriminated, for each of available image areas set in advance in a main scanning direction; an area setting section for setting an area to be processed with respect to said image; a calculation section for calculating a difference between the number s of pixels whose classifications are discriminated with respect to a counting result corresponding to the set area, the numbers being calculated from a line just before the set area and an end line thereof, respectively; a feature discrimination section for discriminating a feature of said set area based on a total sum of the calculated difference; and an image processing section for performing processing to the image in said area according to a discrimination result obtained from the feature discrimination section.

In the present application, when the number of available image areas is lower than the required number of columns, the memory amount required for storing the counting result can be reduced.

The image processing apparatus in accordance with the present application is characterized in that respective features with respect to a plurality of available image areas are discriminated by said feature discrimination section, discrimination results discriminated with respect to said plurality of available image areas are stored in a memory, respectively, a determination section for determining which discrimination result is used among the stored discrimination results is further provided, and processing according to the determined discrimination result is performed to the image in said area.

In the present application, the discrimination result with respect to the available image area is determined to then store only the discrimination result, so that the data amount can be reduced as compared with a case of storing the number of pixels discriminated per line.

The image processing apparatus in accordance with the present application is characterized in that the classification of said pixel is discriminated on the basis of chromatic color or achromatic color of said pixel, a comparison section for comparing a difference between the numbers of pixels discriminated as chromatic with a predetermined value is further provided, and when the difference between the numbers of pixels discriminated chromatic is larger than said predetermined value, said image is discriminated as a chromatic image, whereas when said difference is smaller than said predetermined value, said image is discriminated as an achromatic image.

In the present application, the difference between features calculated from respective lines, a line just before the set area and an end line thereof is calculated, so that it is discriminated whether or not the image for discrimination is the chromatic image. And the discrimination processing is started before the available image area is fixed, and the discrimination result is re-summed after the available image area is fixed, resulting in an improvement in efficiency of the chromatic/achromatic determination processing of the image.

The image processing apparatus in accordance with the present application is characterized in that the classification of said pixel is discriminated on the basis of a segmentation result indicating a component including at least a text component and a halftone component to which the pixel belongs, a comparison section for comparing whether a difference between the numbers of pixels for each component to which said pixel belongs is larger or smaller than a predetermined value for each component is further provided, wherein a document type is discriminated by extracting components where the difference between the numbers of pixels for each component is larger than the predetermined value for each component.

In the present application, the difference between features calculated from respective lines, a line just before the set area and an end thereof is calculated, so that it is discriminated whether the image for discrimination is a text or halftone image, or a background or photographic-image. And the discrimination processing is started before the available image area is fixed, and the discrimination result is re-summed after the available image area is fixed, resulting in an improvement in efficiency of the document type determination processing.

The image processing apparatus in accordance with the present application is characterized in that the classification of said pixel is discriminated on the basis of a determination result of whether or not the pixel belongs to a page background component, a comparison section for comparing a difference between count numbers of the class to which said pixel belongs with a predetermined value is further provided, wherein the page background is discriminated based on a comparison result.

In the present application, the difference between features calculated from respective lines a line just before the set area and an end thereof is calculated, so that the background color of the image for discrimination is discriminated. And the discrimination processing is started before the available image area is fixed, and the discrimination result is re-summed after the available image area is fixed, resulting in an improvement in efficiency of the background determination processing.

An image forming apparatus in accordance with the present application is characterized by comprising the image processing apparatus; and an image forming section for forming an image to which image processing is performed by the image processing apparatus, on a sheet.

In the present application, it is available as one function of a printer machine and a multi-function printer.

A recording medium in accordance with the present application is characterized by recording a computer program for a computer to discriminate a classification of an image and perform processing according to a discrimination result, said computer program comprising the steps of: causing the computer to calculate, from the line composed of a plurality of pixels, features of the pixels in the line; causing the computer to discriminate a classification of the pixels based on the calculated features, and to count the pixels whose classifications are discriminated; causing the computer to set an area to be processed with respect to the image; causing the computer to calculate a difference between the numbers of pixels whose classifications are discriminated, the numbers being calculated from a line just before the set area and an end line thereof, respectively; and causing the computer to discriminate a classification of said area based on the calculated difference, and to perform processing according to a discrimination result to the image in said area.

In the present application, the aforementioned image processing apparatus is achieved by the computer by using the image processing program read from the recording medium.

According to the present application, even if the size in the sub-scanning direction of the image is unknown at start of the image data input, recognition processing can be started without storing pre-scan and image data in the memory. Moreover, when the discrimination result corresponding to the image area set after the image size is fixed (at image data input completion) are re-summed, the processing amount in accordance with the re-sum processing can be reduced as compared with a case of storing the summed result of only corresponding line for each line.

According to the present application, the area is divided also in the main scanning direction to determine the discrimination result, and thus when the available image area is changed to then perform the processing again using the stored image data after storing the image data in a hard disk or the like (for example, when the frame erasure processing is performed), the recognition processing to the newly set available image area can be performed.

According to the present application, when the number of available image areas is lower than the required number of columns, the memory amount required for storing the counting result can be reduced.

According to the present application, the discrimination result with respect to the available image area is determined to then store only the discrimination result, so that the data amount can be reduced as compared with a case of storing the number of pixels discriminated per line.

According to the present application, the difference between features calculated from respective lines, a line just before the set area and an end thereof is calculated, so that it is possible to discriminate whether or not the image for discrimination is the chromatic image.

According to the present application, the discrimination processing is started before the available image area is fixed, and the discrimination result is re-summed after the available image area is fixed, so that it is possible to achieve an improvement in efficiency of the document type determination processing.

According to the present application, the difference between features calculated from respective lines, a line just before the set area and an end thereof is calculated, so that it is possible to discriminate whether the image for discrimination is a text or halftone image, or a background or photographic-image.

According to the present application, the difference between features calculated from respective lines, a line just before the set area and an end thereof is calculated, so that the background color of the image for discrimination can be discriminated.

According to the present application, it is available as one function of a printer machine and a multi-function printer.

According to the present application, the aforementioned image processing apparatus can be achieved by the computer by using the image processing program read from the recording medium.

The above and further objects and features of the invention will more fully be apparent from the following detailed description with accompanying drawings.

DETAILED DESCRIPTION

Hereinafter, embodiments will be described in full detail based on the drawings.

First Embodiment

Figure 1:
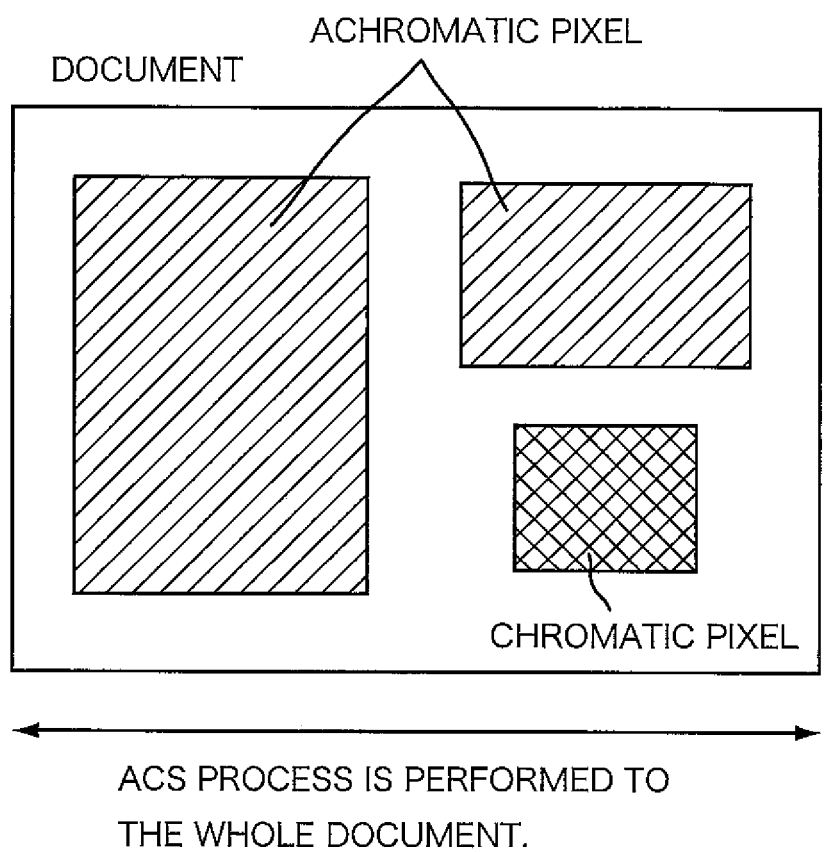
FIG. 1 is an explanatory view illustrating an example in which determination results are different depending on available image areas.
Figure 2:
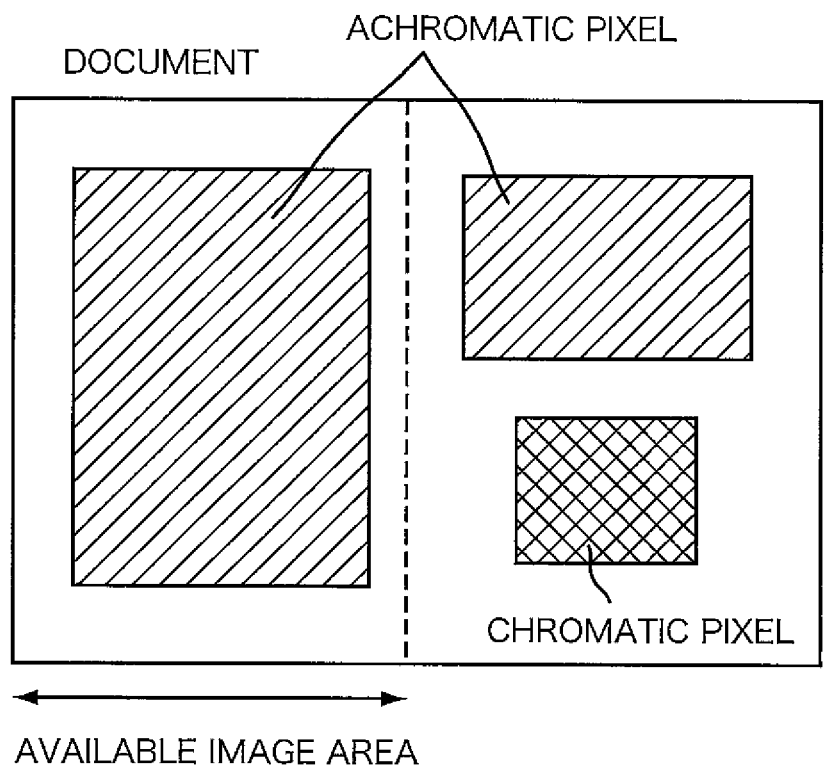
FIG. 2 is an explanatory view illustrating an example in which determination results are different depending on available image areas.
Figure 3:
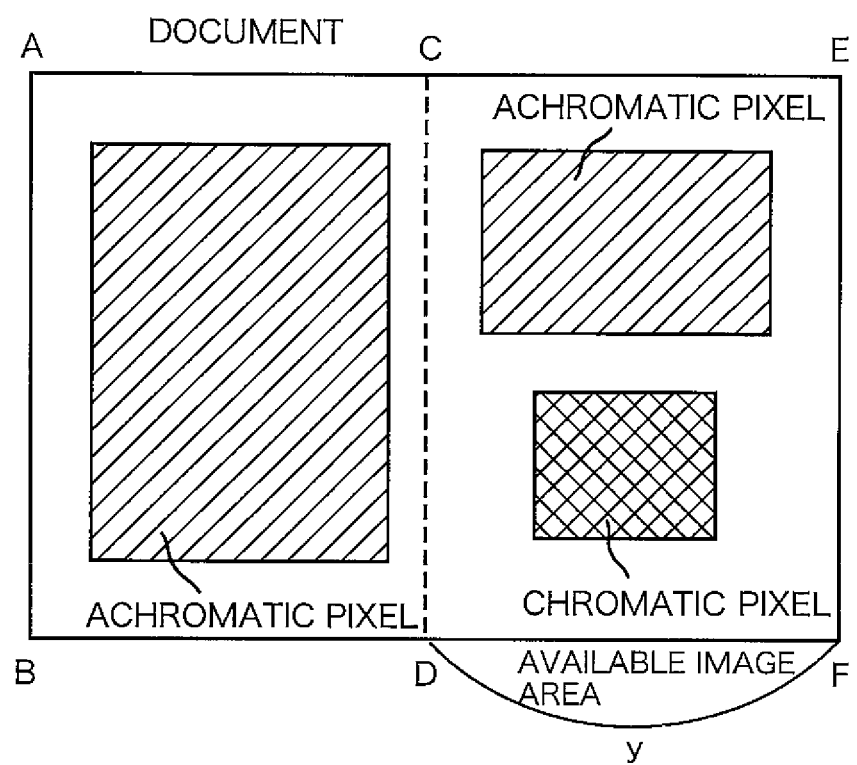
FIG. 3 is an explanatory view illustrating processing when a document is read per line by a automatic document feeder.
Figure 4:
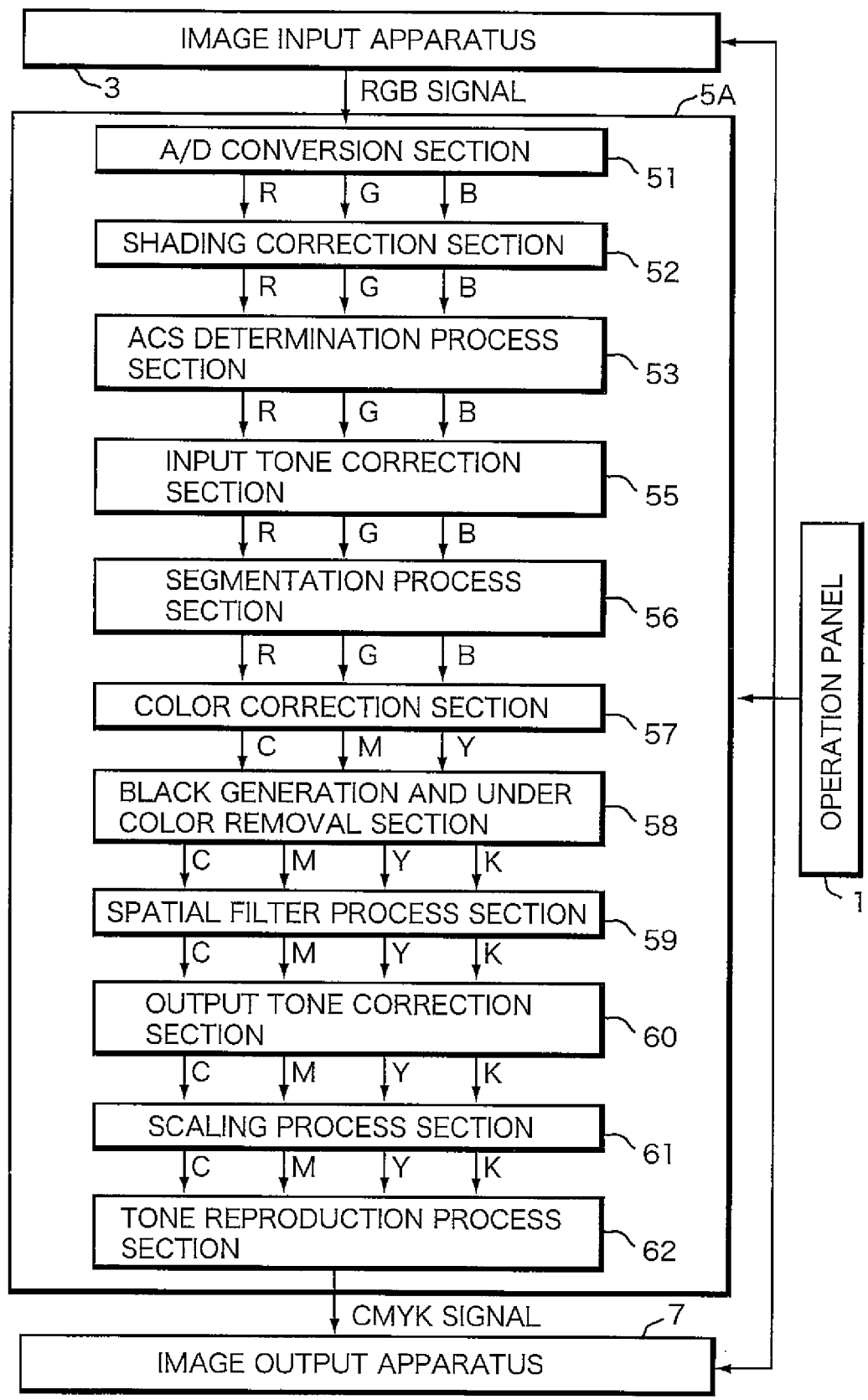
FIG. 4 is a block diagram explaining an internal configuration of an image processing system provided with an image processing apparatus in accordance with the present application.

FIG. 4 is a block diagram explaining an internal configuration of an image processing system provided with an image processing apparatus in accordance with the present application. The image processing system in accordance with a first embodiment is provided with an operation panel 1, an image input apparatus 3, an image processing apparatus 5A, and an image output apparatus 7.

The operation panel 1 is composed of a liquid crystal display, various switches, and the like, and it displays information to be informed to users, and receives various selection operations or the like by the users.

The image input apparatus 3 is reading means for optically reading images of documents, and it is provided with a light source for irradiating the document for reading, an image sensor such as CCD (Charge Coupled Device), and the like.

Figure 5:
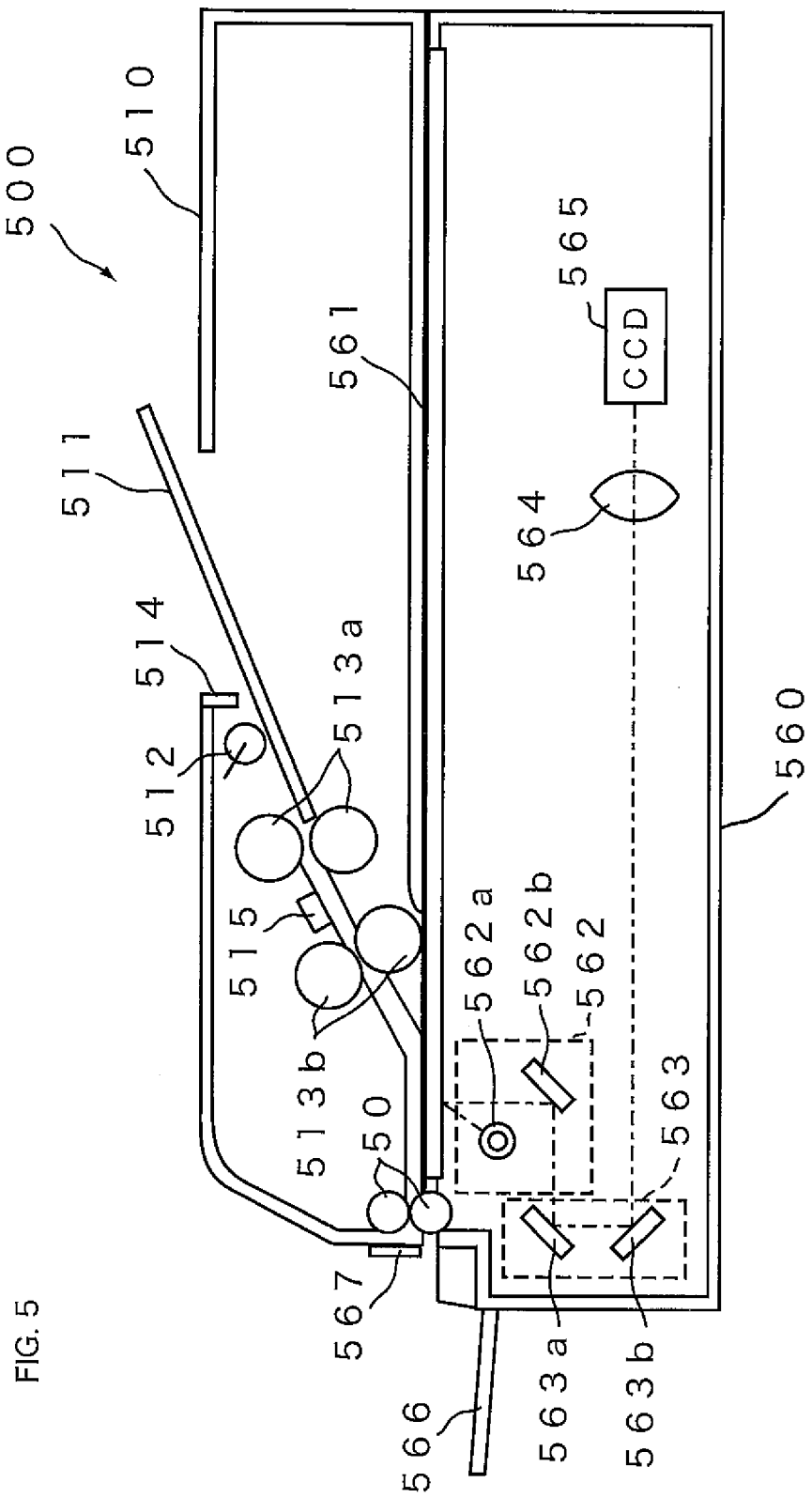
FIG. 5 is a schematic view showing a configuration of an image input apparatus.

FIG. 5 is a schematic view showing a configuration of the image input apparatus 3. The image input apparatus 3 is provided with a document transport section composed of an upper housing 510, a scanner section composed of a lower housing 560, and the like. The upper housing 510 is provided with a document set sensor 514 for detecting a document mounted on a document tray 511, a pick-up roller 512 for feeding one document at a time, transport rollers 513a and 513b for transporting the document in order to read the image on the document, a document delivery roller 50 for delivery the document, a document delivery sensor 567 for detecting the delivered document, and the like. The transport roller (matching roller) 513b is provided with an electromagnetic clutch (not shown) at a driving shaft so as to allow transmission of a driving force from a drive motor (not shown) to be controlled, and it is stopped in a state where there is no document. It is then set to rotate in a direction of transporting the document to a downstream side when a front end of the document contacts with a feed timing sensor 515 and a predetermined signal is transmitted from this sensor. The transporting roller 513b rotates so as to transport the document to the downstream side after the front end of the document carried from the upper stream side collides with a nip portion of the transporting roller 513b to thereby form a predetermined deformation in the document while it is stopped. At this time, the front end of the document is adjusted so as to be perpendicular to a transporting direction by the nip portion of the transporting roller 513b.

There are provided scanning sections 562 and 563 which reciprocate in parallel along an undersurface of a mounting base 561, an imaging lens 564 and a CCD line sensor 565 which is a photoelectric transducer, a delivery tray 566, and the like in the lower housing 560. The scanning section 562 is provided with a light source 562a (for example, halogen lamp or the like) for irradiating a light to the document carried from the document tray 511 or the document mounted on the mounting base 561, a mirror 562b for guiding a light reflected by the document to a predetermined optical path, and the like. Additionally, the scanning section 563 is provided with mirrors 563a and 563b for guiding the light reflected by the document to a predetermined optical path and the like.

Figure 6:
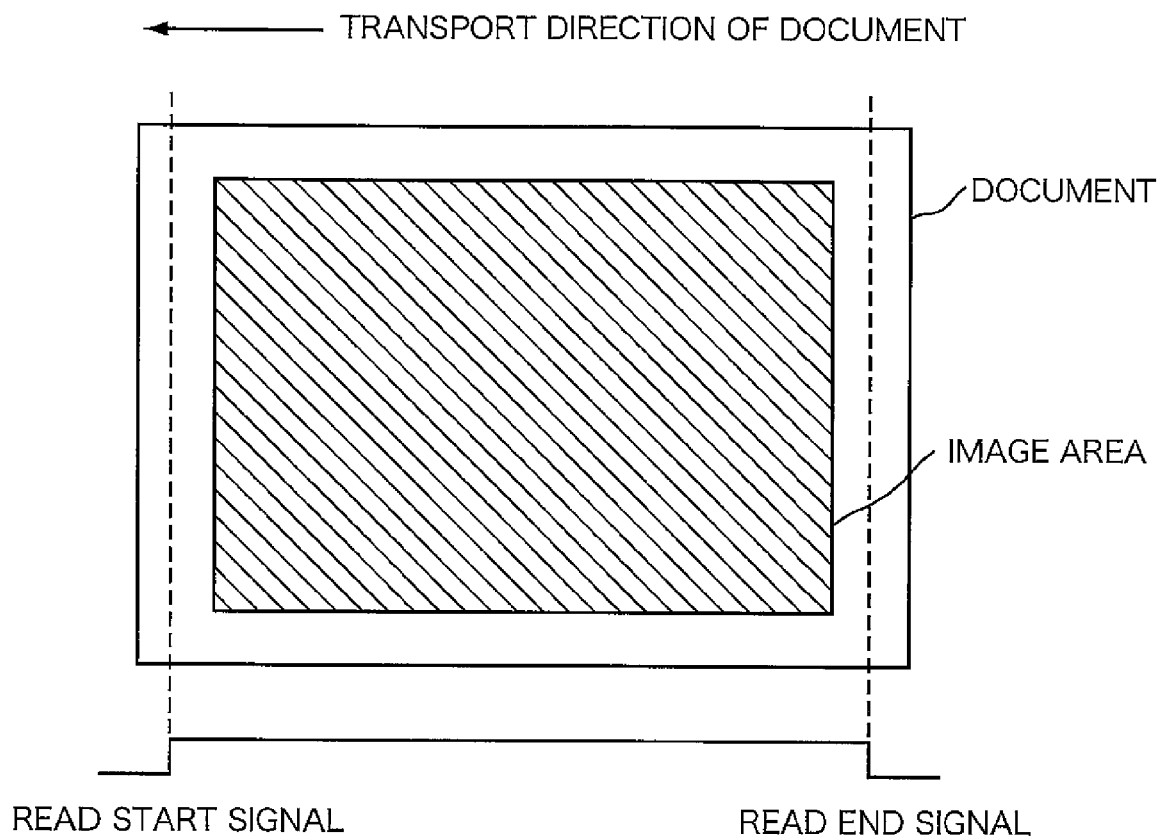
FIG. 6 is a schematic view showing signals outputted from a feed timing sensor.

The imaging lens 564 focuses the reflected light guided from the scanning section 563 to thereby form an image in a predetermined position on the CCD line sensor 565. The CCD line sensor 565 photoelectrically converts the focused light image to then output electrical signals. Namely data whose color is separated into respective color components of R (red), G (green), and B (blue) (RGB signals) based on the chromatic image which is read from the document (for example, surface of the document) is outputted to the image processing apparatus 5A. At this time, the image input apparatus 3 outputs the data which is read one line at a time in a sub-scanning direction, to the image processing apparatus 5A. Additionally, signals outputted from the feed timing sensor 515, namely, a read start signal and a read end signal of the document are notified to the image processing apparatus 5A as shown in FIG. 6.

The image processing apparatus 5A performs suitable image processing after converting analog electrical signals outputted from the image input apparatus 3 into digital electric signals, and outputs the obtained image data to the image output apparatus 7. Incidentally, an internal configuration, operations, or the like of the image processing apparatus 5A will be described in full detail as follows.

The image output apparatus 7 is means for forming an image on a sheet, such as a paper, an OHP film, or the like based on image signals outputted by the image processing apparatus 5A. For that reason, the image output apparatus 7 is provided with an electric charger for charging a photoreceptor drum at a predetermined potential, a laser writing machine for emitting a laser beam according to the image data received from the outside to generate an electrostatic latent image on a photoreceptor drum, a developer for supplying a toner to the electrostatic latent image formed on a photoreceptor drum surface to develop it, a transcriber for transcribing a toner image formed on the photoreceptor drum surface onto a paper, and the like (un-showing), and it forms an image that the user desire on the paper with an electrophotography system. Note herein that, it may be a configuration to form the image with an inkjet system, a thermal transfer system, a sublimation system, or the like, other than forming the image with the electrophotography system using the laser writing machine.

Next, the internal configuration of the image processing apparatus 5A will be described. An A/D conversion section 51 converts analog signals of RGB inputted from the image input apparatus 3 into digital signals. A shading correction section 52 performs processing to remove various distortions generated in an illuminating system, an image focusing system, and an image sensing of the image input apparatus 3, to digital RGB signals outputted from the A/D conversion section 51. The shading-compensated RGB signals are outputted to an ACS determination process section 53.

The ACS determination process section 53 converts RGB reflectance signal into RGB density (pixel value) signal and performs processing to select whether the document image is a chromatic image or an achromatic image, using a part of pixels composing the document image. Processing configuration in the ACS determination process section 53 will be described in full detail as follows. Determination results in the ACS determination process section 53 will be outputted to an input tone correction section 55, a segmentation process section 56, a color correction section 57, a black generation undercolor removal section 58, a spatial filter process section 59, and a tone reproduction process section 62 in the subsequent stages.

The input tone correction section 55 performs image quality adjustment processing, such as removal of background density, contrast, or the like. The segmentation process section 56 performs processing of classifying each pixel in the inputted image into any one of a text component, a halftone component, and a photograph (continuous tone) component based on the RGB signals. The segmentation process section 56 outputs a segmentation class signal to indicate to which segment the pixel belongs, to the black generation undercolor removal section 58, the spatial filter process section 59, and the tone reproduction process section 62 in the subsequent stages based on the separation results, and also outputs the inputted RGB signals to the color correction section 57 in the subsequent stage as they are.

The color correction section 57 performs processing of removing color impurity resulting from spectral characteristics of a CMY color material including useless absorption components in order to truthfully reproduce color reproduction. The color-compensated RGB signals are outputted to the black generation undercolor removal section 58 in the subsequent stage. The black generation undercolor removal section 58 performs processing of black generation for generating a black (K) signal from three color signals of CMY after the color compensation, and generation of new CMY signals given by subtracting the K signal obtained by the black generation, from the original CMY signals. The three color signals of CMY are converted into four color signals of CMYK by this processing.

There is a method of performing black generation processing using skeleton black as one example of black generation processing. In this method, supposing that input-output characteristics of a skeleton curve is y=f(x) data inputted are C, M, and Y data outputted are C', M', Y', and K', and a UCR rate (UCR: Under Color Removal) is α (0<α<1), the black generation undercolor removal processing is represented by following equations.

$$K'=f\{\min(C,M,Y)\}$$

$$C'=C-\alpha K'$$

$$M'=M-\alpha K'$$

$$Y'=Y-\alpha K'$$

The spatial filter process section 59 performs spatial filter processing by using a digital filter with respect to the image data of the CMYK signals inputted from the black generation undercolor removal section 58, based on the segmentation class signal, and performs processing so as to prevent blur or granular degradation of the outputted image by compensating spatial frequency characteristics.

For example, high frequency components in the segment divided into a text component by the segmentation process section 56 is enhanced by edge enhancement operation in the spatial filter processing using the spatial filter process section 59, so that reproducibility particularly for a black text or a chromatic text is improved. At the same time, the tone reproduction process section 62 selects binarization or multi-level dithering process on a high resolution screen suitable for high frequency reproduction. Additionally, the spatial filter process section 59 performs low-pass filter processing with respect to the segment divided into the halftone component by the segmentation process section 56 for removing halftone components. After the output tone correction section 60 performs output tone correction processing for converting signals such as density signals or the like into a halftone screen ratio which is a characteristics of a color image output apparatus, the tone reproduction process section 62 performs tone reproduction processing in which the image is segmented into the pixels to eventually allow respective tones to be reproduced. Meanwhile, with respect to the segment divided into a photograph component by the segmentation process section 56, binarization or multi-level dithering process is performed in the screen particularly suitable for tone reproduction. Further, a scaling process section 61 performs variable magnification processing if needed, before performing segmentation reproduction processing.

The image data to which above-mentioned each processing is performed is once stored in memory means (not shown), and is read at a predetermined timing to be outputted to the image output apparatus 7.

Figure 7:
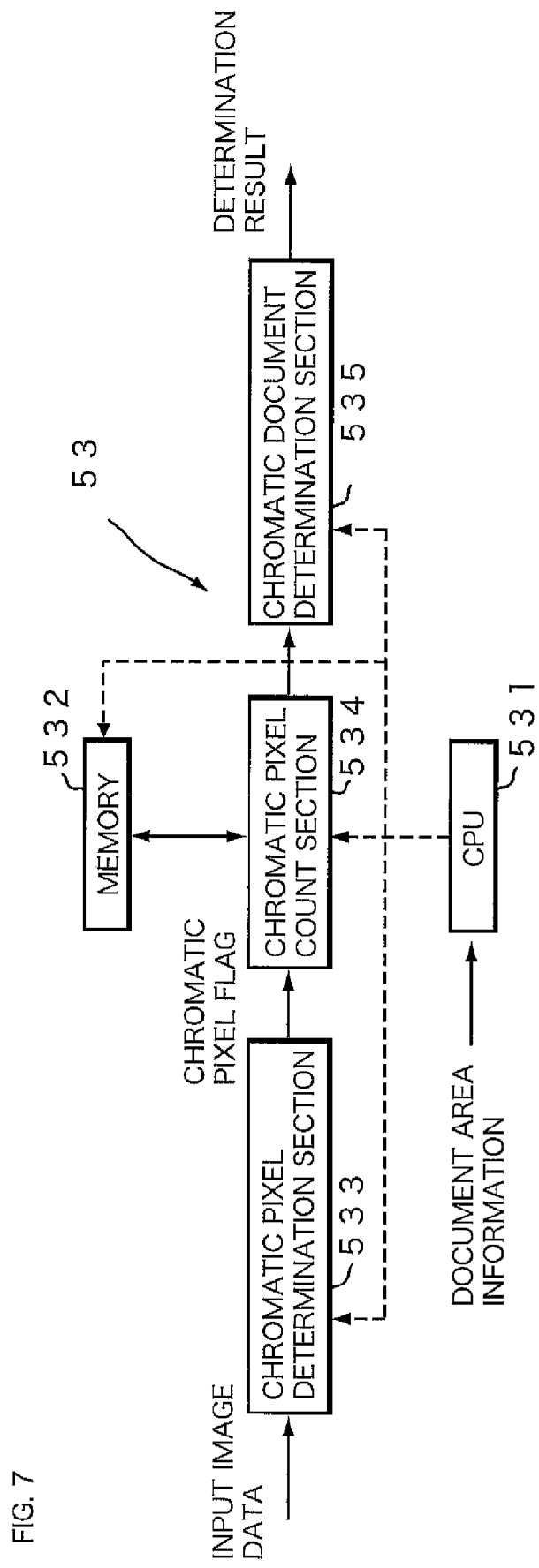
FIG. 7 is a block diagram showing an internal configuration of an ACS determination processing section.

Hereinafter, a configuration of the ACS determination process section 53 will be described. FIG. 7 is a block diagram showing an internal configuration of the ACS determination process section 53. The ACS determination process section 53 is provided with a CPU 531, a memory 532, a chromatic pixel determination section 533, a chromatic pixel count section 534, and a chromatic document determination section 535.

The CPU 531 recognizes a document size from information on a read start position and a read end position of the document notified from the image input apparatus 3. It also acquires and analyzes information on a scaling, a processing object position, or the like for performing the image processing with respect to the document, inputted from the operation panel 1 or the like, and recognizes it as available image area information.

Figure 8:
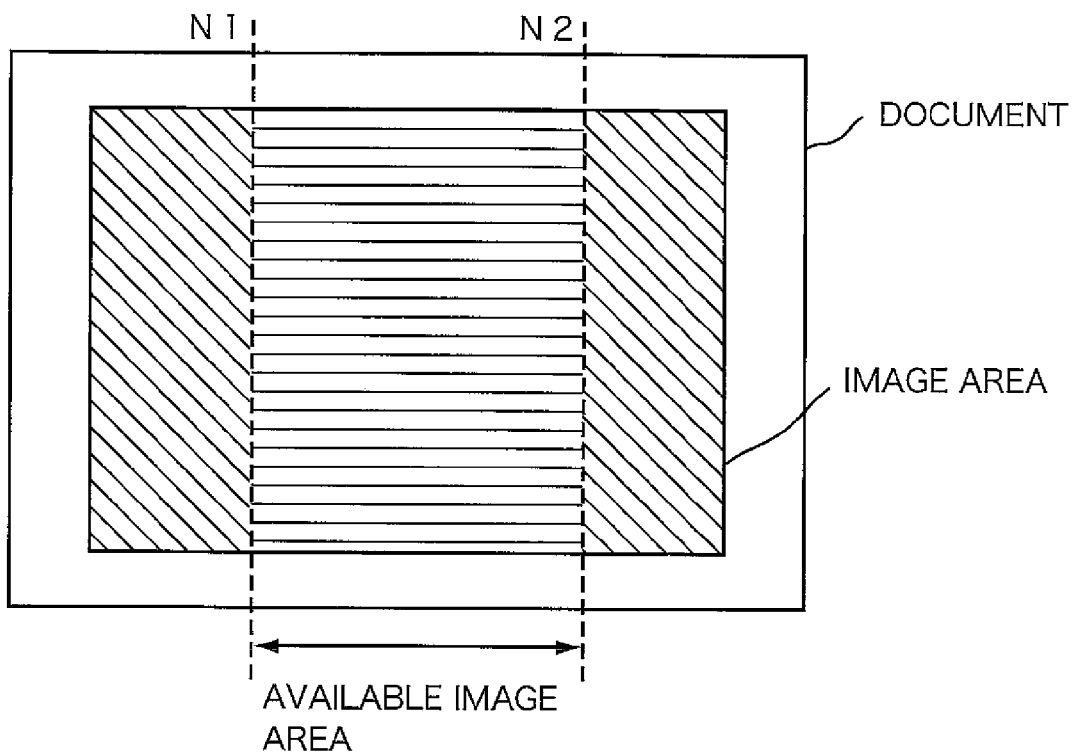
FIG. 8 is an explanatory view illustrating an available image area.

FIG. 8 is an explanatory view illustrating the available image area. For example, when variable magnification processing is specified, the available image area is set by setting a current image area according to a set variable magnification rate. Alternatively, even if the magnification is set to the same magnification, a predetermined output image area is set as the available image area when the document is outputted as a paper size smaller than a document size. For example, when a document with A3 size is outputted as a paper with A4 size, a right half area (area set as default) of the document with A3 size is set as the available image area.

The chromatic pixel determination section 533 determines whether or not the pixel is a chromatic pixel (or block) by the pixel unit (or block, for example, a block composed of 8*8 pixels). The result is outputted to the chromatic pixel count section 534 as a chromatic pixel flag. The determination of whether it is a chromatic pixel or an achromatic (black and white) pixel is performed by comparing, for example, a value of max(R,G,B)−min(R,G,B) with a threshold value (THcolor_p) (for example, about 5%-10% of a gradation value of the image data (in the case of 8-bit image data, 256)). When max(R,G,B)−min(R,G,B) is equal to the threshold value THcolor_p or more, the pixel is determined as a chromatic pixel (chromatic), and when it is smaller than the aforementioned threshold value, the pixel is determined as an achromatic pixel.

The chromatic pixel count section 534 increments (increases) the count number by 1 when the chromatic pixel flag inputted from the chromatic pixel determination section 533 indicates it is a chromatic pixel, and when the flag indicates it is not a chromatic pixel, the count number remains as it is. Whenever the count of one line is performed, the chromatic pixel count number up to now is outputted to the memory 532. At this time, initialization of the counter is performed at the document read start position, but not performed for each line. The count number of the chromatic pixel will always be a total sum from the document read start position.

The memory 532 sequentially stores the chromatic pixel count number in the memory per line. Additionally, the count number of the line requested from the chromatic document determination section 535 is outputted to the chromatic document determination section 535.

The chromatic document determination section 535 receives the available image area information from the CPU 531, and requests a chromatic pixel count number N1 in one previous line of the available image area and a chromatic pixel count number N2 in the end line of the available image area (refer to FIG. 8) to the memory 532 based on this information. A difference between two count numbers inputted from the memory 532 is calculated to determine the chromatic pixel count number in the available image area, and it is determined whether the document is a chromatic document or an achromatic document by comparing it with the threshold value, and the determination result is outputted. As the threshold value THcolor_d, the number of pixels in a size of about 1 square cm is used with respect to an inputted document, for example. Since the value of threshold value THcolor_d changes with a resolution of the image input apparatus, it is set according to the resolution. Subsequently, when the count number is equal to the threshold value THcolor_d or more, it is determined to be a chromatic document, and if not, it is determined to be an achromatic document.

Figure 9:
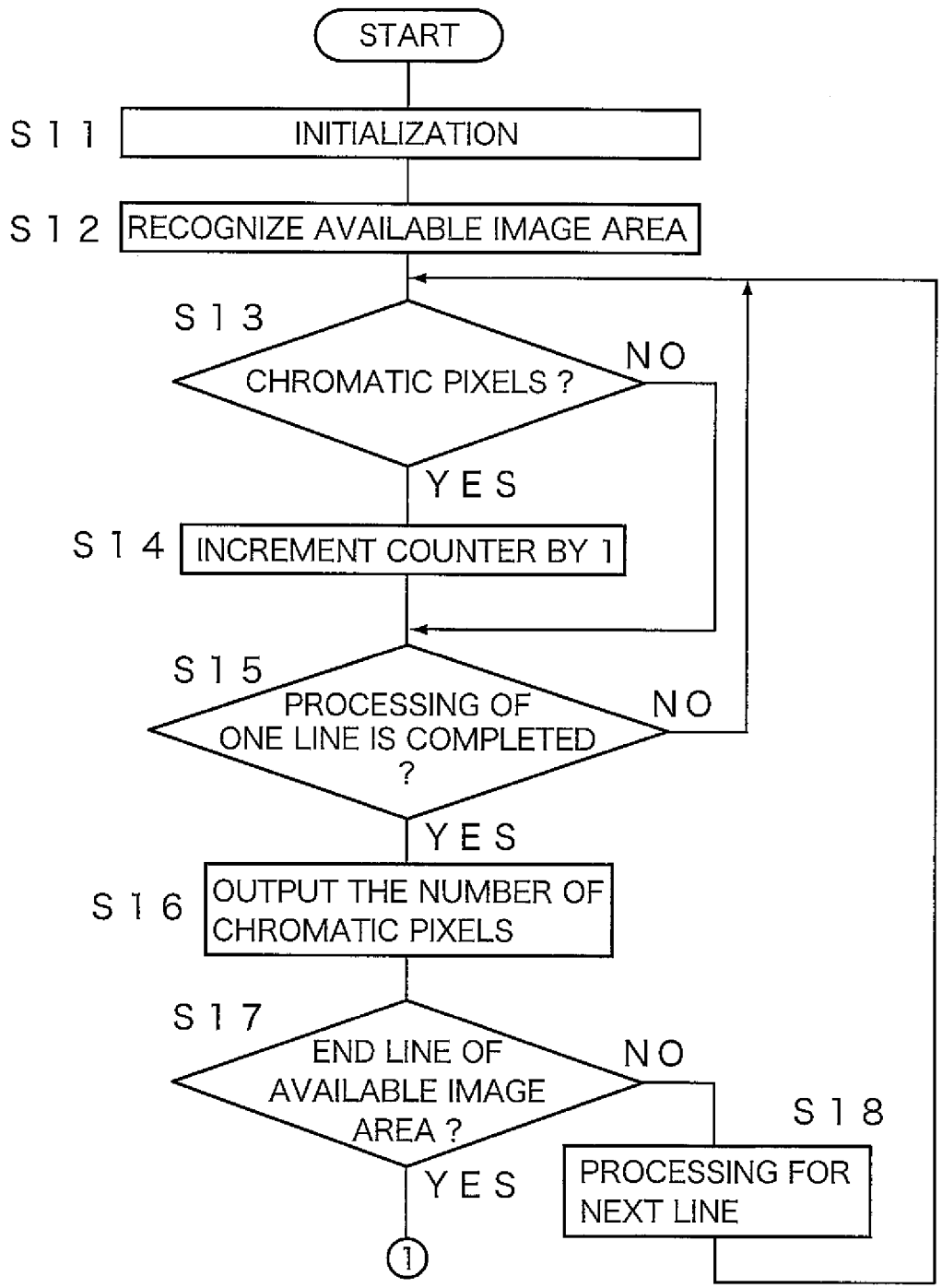
FIG. 9 is a flow chart illustrating a procedure that the ACS determination processing section executes.
Figure 10:
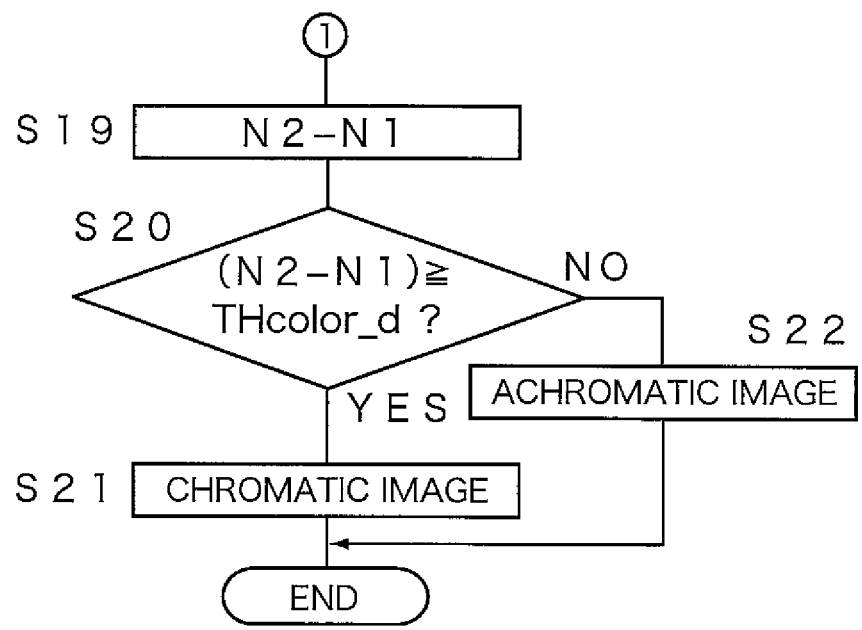
FIG. 10 is the flow chart illustrating the procedure that the ACS determination processing section executes.

FIG. 9 and FIG. 10 are flow charts illustrating procedures that the ACS determination process section 53 executes. The CPU 531 first initializes the chromatic pixel flag, the count number, or the like stored in the memory (Step S11). Subsequently, it recognizes the document size from the information on the read start position and the read end position of the document notified from the image input apparatus 3, and acquires and analyzes the information including the scaling, the processing object position, or the like for performing the image processing to the document inputted from the operation panel 1 or the like to then recognize it as the available image area information (Step S12).

Next, the chromatic pixel determination section 533 determines whether or not the pixel is a chromatic pixel by the pixel unit in one line (Step S13). When it is determined to be a chromatic pixel (S13: YES), the chromatic pixel count section 534 increments the counter by 1 (Step S14). Meanwhile, when it is determined not to be a chromatic pixel (S13: NO), the value of the counter is remained as it is.

Subsequently, the CPU 531 determines whether or not chromatic pixel determination processing of one line is completed (Step S15), and when it determines that the process has not completed yet (S15: NO), the process is returned to Step S13.

When it is determined that the chromatic pixel determination processing of one line is completed (S15: YES), the chromatic pixel count section 534 outputs the number of chromatic pixels of one line to the memory 532 (Step S16). Subsequently, the CPU 531 determines whether or not the current line is the end line of the available image area (Step S17), and when it is determined not to be the end line (S17: NO), the next line is processed (Step S18) and the process is returned to Step S13.

When it is determined that the current line is the end line of the available image area (S17: YES), the chromatic document determination section 535 calculates the difference between the chromatic pixel count number N1 in one previous line of the available image area and the chromatic pixel count number N2 in the end line of the available image area (Step S19), and determines whether or not the difference (N2−N1) is equal to the threshold value THcolor_d or more (Step S20). When it determines that the difference (N2−N1) is equal to the threshold value THcolor_d or more (S20: YES), it is determined that the document image is the chromatic image (Step S21), while when it determines that the difference (N2−N1) is smaller than the threshold value THcolor_d (S20: NO), it is determined that the document image is an achromatic (black and white) image (Step S22).

Figure 11:
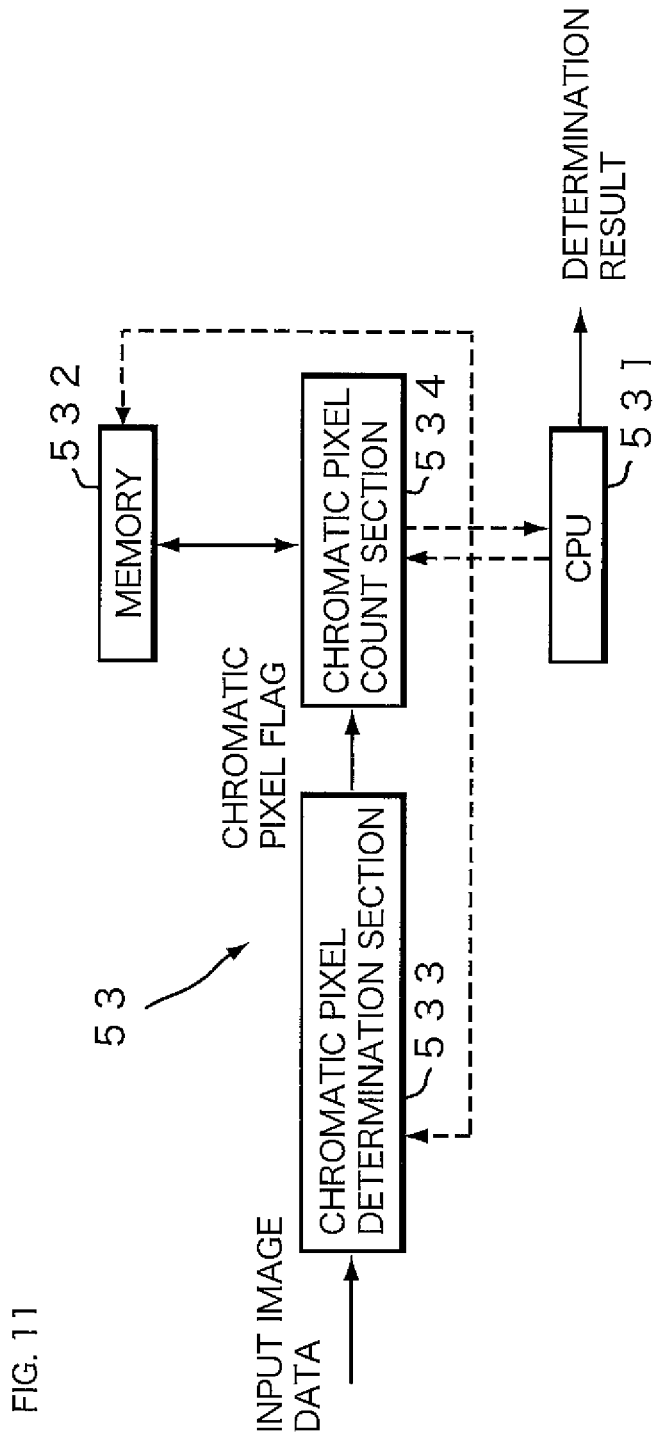
FIG. 11 is a block diagram showing a modified example of the ACS determination processing section.

Note that, although there is employed such a configuration that the processing to determine a chromatic document or an achromatic document from the count number per line is performed by the chromatic document determination section 535 in the present embodiment, a configuration for the CPU 531 to perform it may be employed. FIG. 11 is a block diagram showing a modified example of the ACS determination process section 53.

As described above, since the data to be stored in the memory 532 is a chromatic pixel accumulated count number per line unit in the present embodiment, it is achievable by a small memory size rather than that of storing the image data. Further, since the chromatic pixel determination, the chromatic pixel count, and the storage in the memory are performed concurrently with the document scan, the only processing required after the scan completion is to read two values from the memory to then determine whether or not it is the chromatic document, and thus allowing the ACS processing to be performed at high speed with almost no time loss wherever the available image area is located in the document.

Second Embodiment

There may be employed such a configuration that the determination result is sequentially added to the previous result for each column set in advance in the main scanning direction. In such a configuration, classification discrimination according to the setting can be performed even if the available image area may be changed by the setting at the time of rework.

A apparatus configuration thereof is similar to that of the first embodiment, wherein the document is read by one line in the sub-scanning direction by the image input apparatus 3, and the result is inputted into the chromatic pixel determination section 533 of the ACS determination process section 53. Additionally, the feed timing sensor 515 is mounted on the image input apparatus 3, which notifies the read start position and the read end position of the document to the CPU 531.

The CPU 531 recognizes the document size from the information on the read start position and the read end position of the document notified from the image reader 3. Additionally, it acquires and analyzes the information including the scaling, the processing object position, or the like for performing the image processing to the document inputted from the operation panel 1 and a host computer which is not shown in the drawing, and notifies it to the chromatic document determination section 535 as the available image area information.

Figure 12:
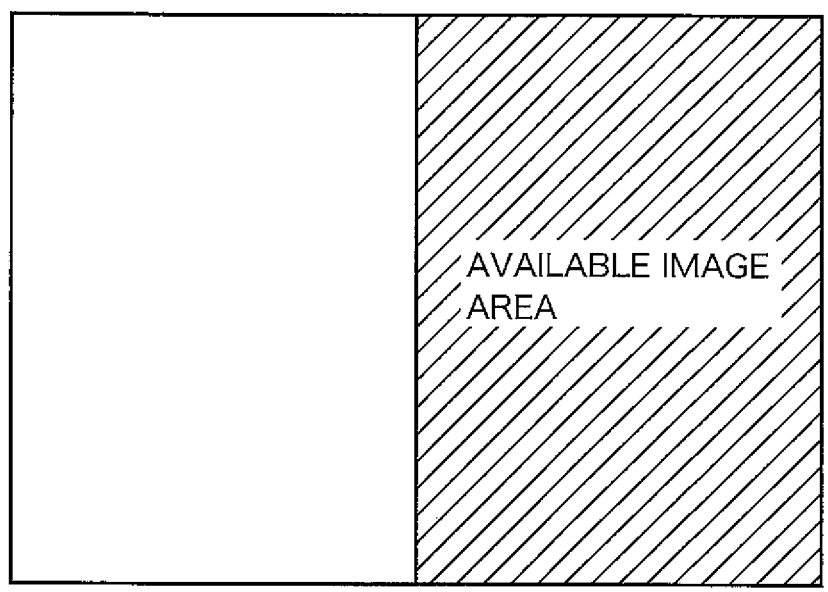
FIG. 12 is a schematic view showing a setting example of the available image area.
Figure 13A:
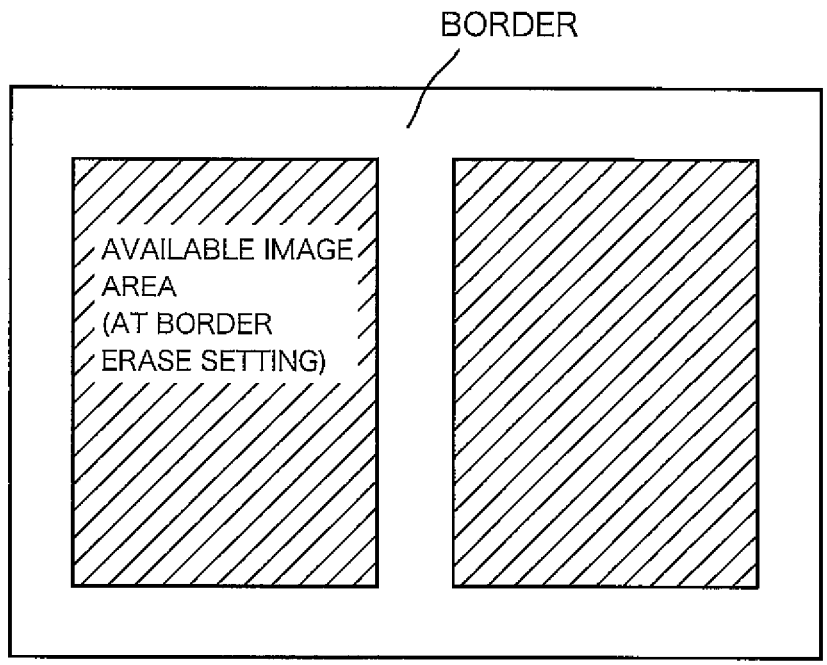
FIGS. 13A and 13B are schematic views showing the setting examples of the available image area.
Figure 13B:
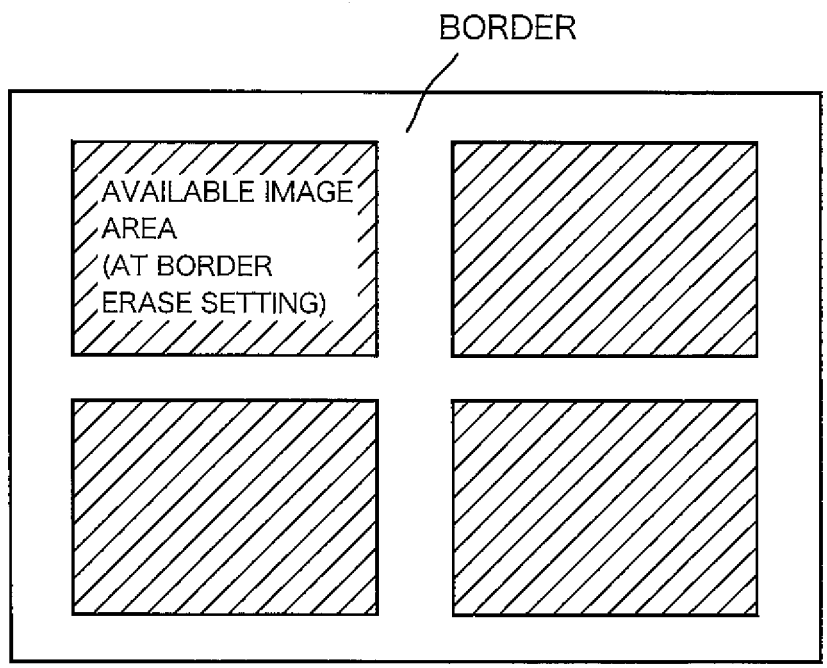

As for the available image area, for example, when the variable magnification processing is specified, the area of the current image is set according to the set variable magnification rate. Alternatively, even if the magnification is set to the same magnification, a predetermined image area to be outputted is set as the available image area when it is outputted as the paper size smaller than the document size. FIG. 12 and FIGS. 13A and 13B are schematic views showing the setting examples of the available image area. For example, when a document with A3 size is outputted as a paper with A4 size, the right half area (area set as default) of the document with A3 size is set as the available image area (FIG. 12). Meanwhile, an area which is specified as an area other than a frame by a frame erasing function or the like is set as the available image area (FIGS. 13A and 13B). Namely, areas other than the available image area are shown as the frame in FIGS. 13A and 13B.

The chromatic pixel determination section 533 determines whether or not the inputted image data the chromatic pixel by the pixel unit. The result determined by the chromatic pixel determination section 533 is outputted to the chromatic pixel count section 534 as the chromatic pixel flag. The determining whether it is a chromatic pixel or an achromatic (black and white) pixel is performed by comparing, for example, a value of max(R,G,B)−min(R,G,B) with a threshold value (THcolor_p) (for example, about 5%-10% of a gradation value of the image data (in the case of 8-bit image data, 256)). When max(R,G,B)−min(R,G,B) is equal to the threshold value THcolor_p or more, it is determined as chromatic (color), and when it is smaller than the aforementioned threshold value, it is determined as achromatic (black and white).

Figure 14:
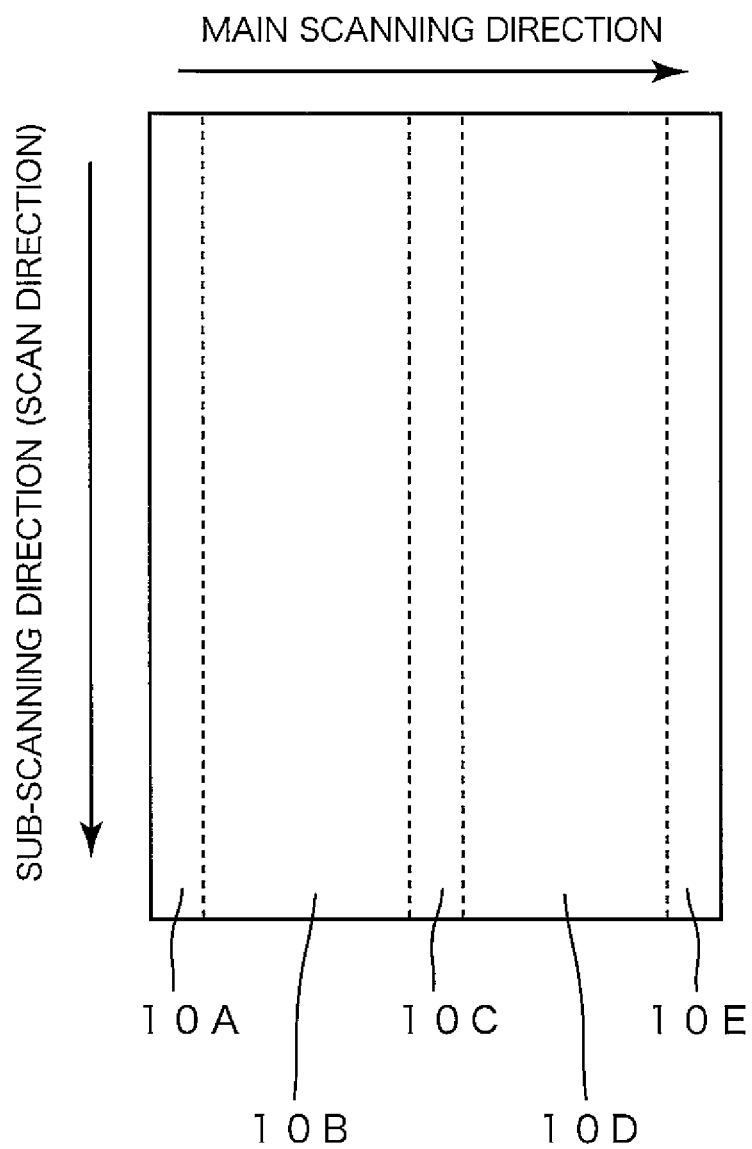
FIG. 14 is a schematic view showing an example of dividing a column.

The chromatic pixel count section 534 respectively counts the chromatic pixels with respect to each column of the image data, which are set in advance. FIG. 14 is a schematic view showing a division example of the column. The example in FIG. 14 shows behavior that the inputted image is divided into five columns 10A-10E in the main scanning direction, the chromatic pixels are counted with respect to these five columns 10A-10E, respectively. Namely, when the chromatic pixel flag inputted from the chromatic pixel determination section 533 indicates it is a chromatic pixel, the count number is incremented by 1, when the flag indicates it is not the chromatic pixel, the count number remains as it is. Whenever the count of one line is performed, the chromatic pixel count number up to now is outputted to the memory 532. At this time, initialization of the counter is performed at the document read start position, but not performed for each line. The count number of the chromatic pixel will always be a total sum from a document read start line.

Figure 15:
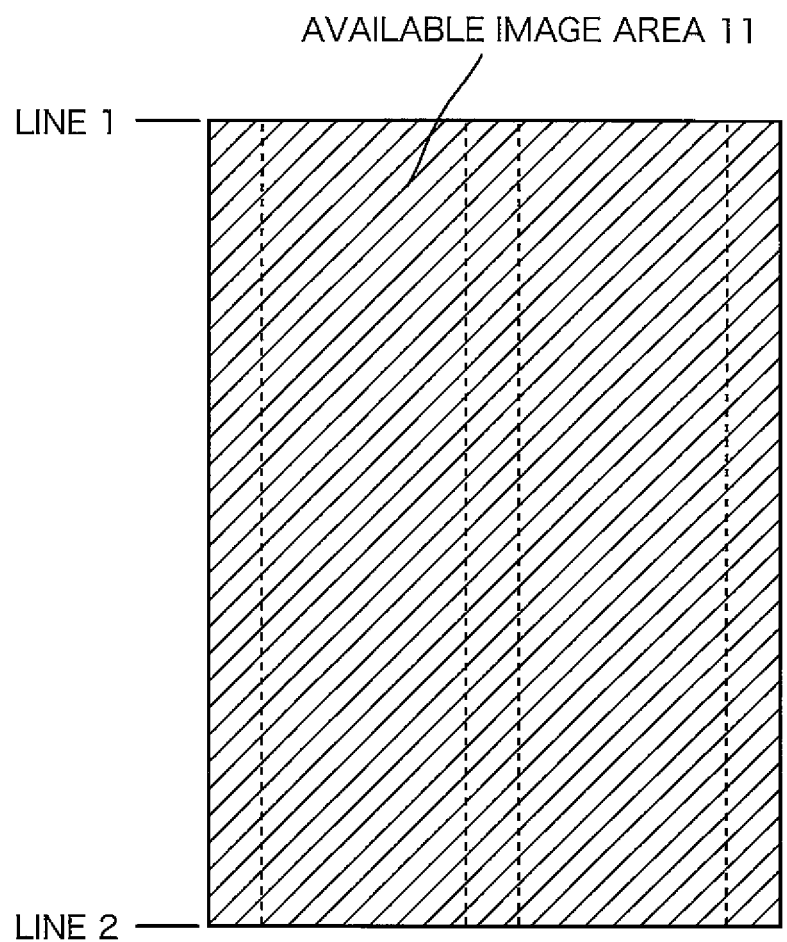
FIG. 15 is a schematic view showing a setting example of the available image area.
Figure 16:
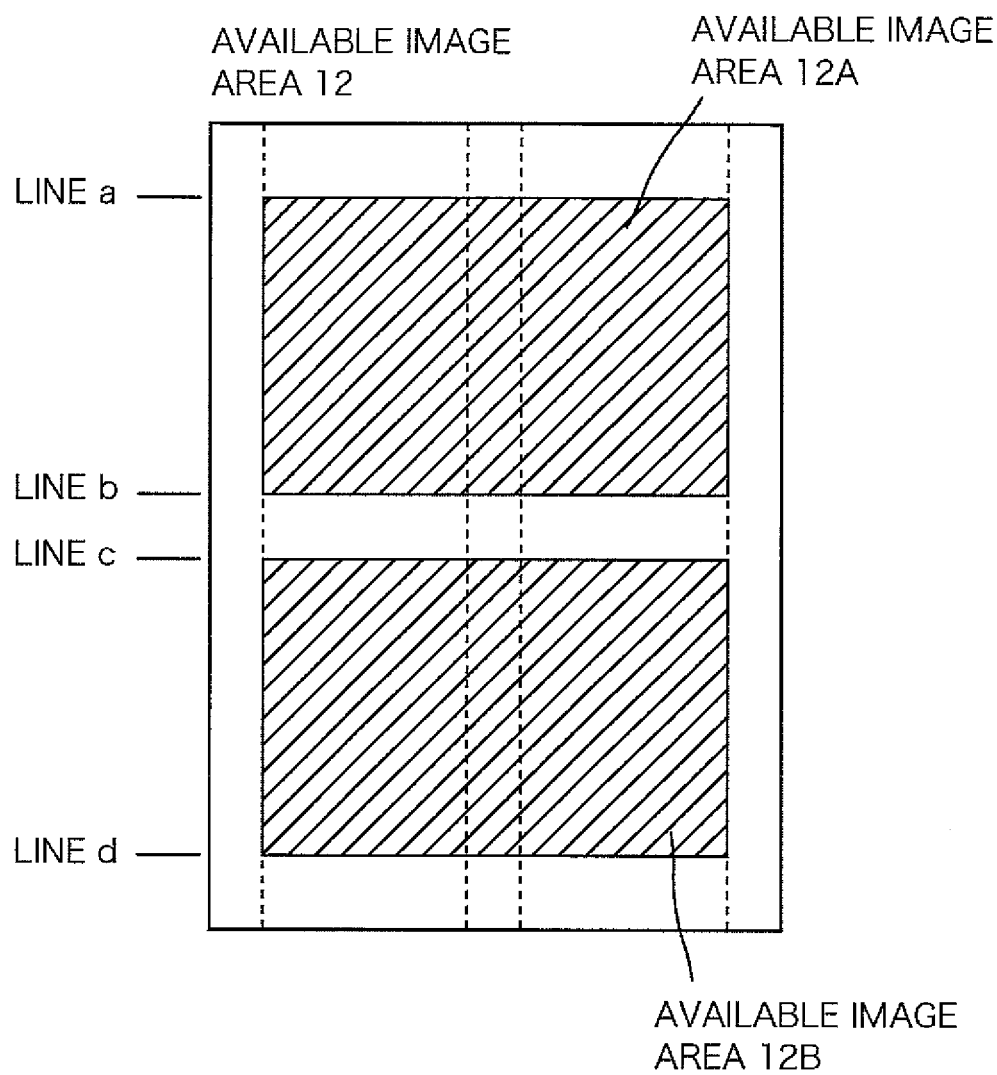
FIG. 16 is a schematic view showing a setting example of the available image area.
Figure 17:
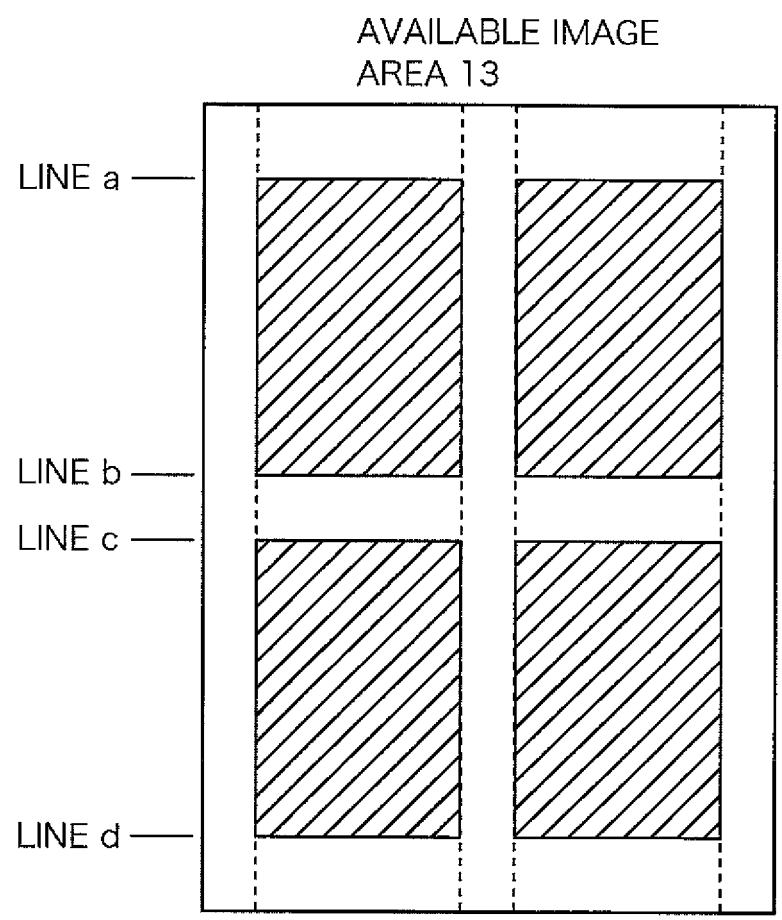
FIG. 17 is a schematic view showing a setting example of the available image area.

Note herein that, a method to divide the area into the columns is determined by a mode selected at scanning or a mode selectable at rework (for example, a frame erasure mode). FIG. 15 through FIG. 17 are schematic views showing setting examples of the available image area. For example, in the frame erasure mode or the like, when patterns shown in FIG. 15 through FIG. 17 are displayed on a display unit, such as a liquid crystal display to allow the available image areas 11-13 to be selected, the column is divided into five. Alternatively, patterns to be divided (for example, divided into a predetermined block (for example, a block which is composed of 7*7 pixels)) may be defined in advance. As for how to divide it, patterns which can be appropriately processed when the rework is performed may be defined using various image samples in advance.

Figure 18:
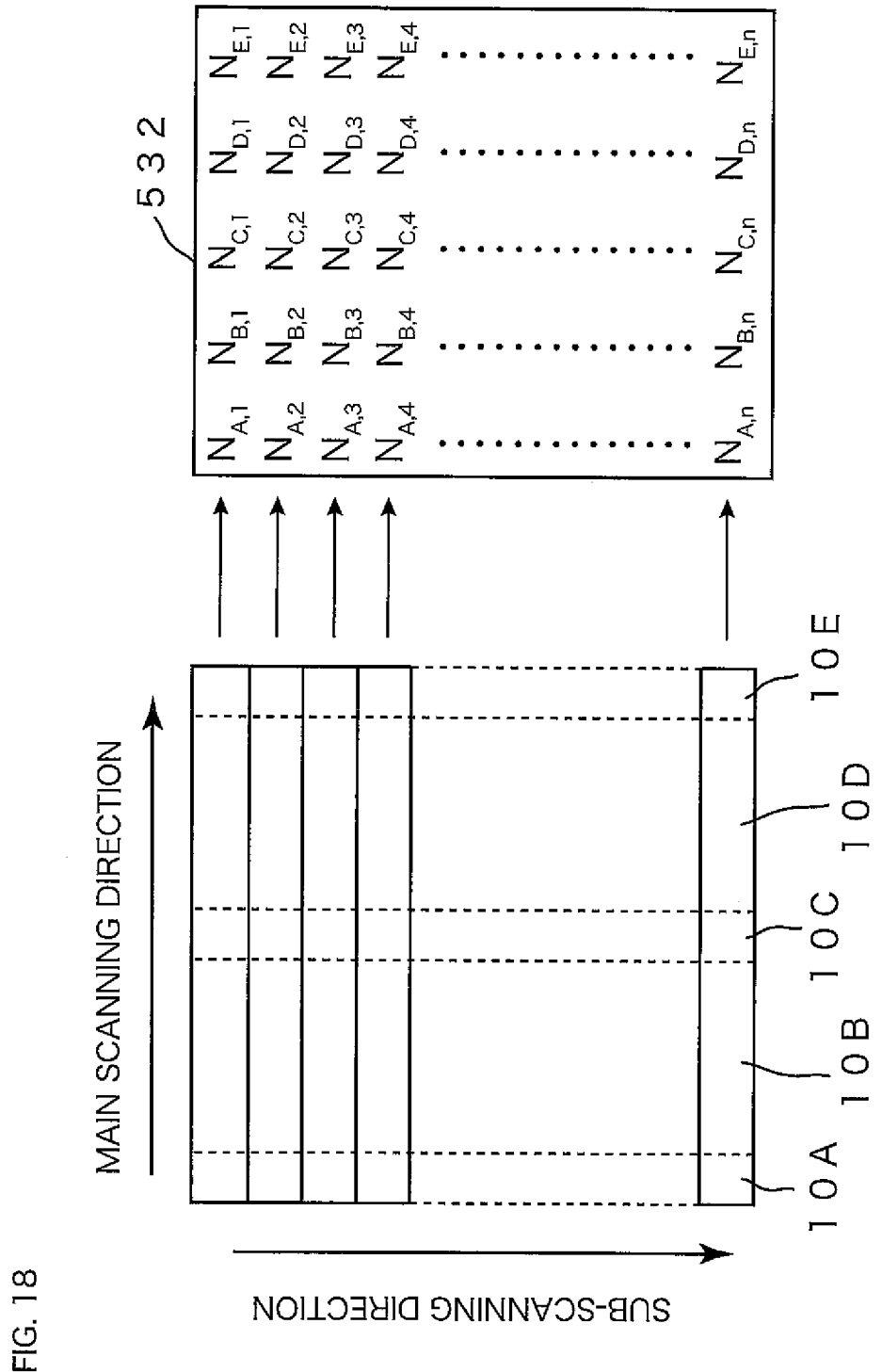
FIG. 18 is a schematic view showing an example of storing a chromatic pixel count number in a memory.

The chromatic pixel count number for each column is sequentially stored in the memory 532 per line. A schematic view in FIG. 18 shows an example of storing the chromatic pixel count number into the memory 532. The memory 532 outputs the count number of the line requested from the chromatic pixel determination section 533 to the chromatic document determination section 535.

The chromatic document determination section 535, receives the available image area information from the CPU 531, and requests a chromatic pixel count number N1 in one previous line of the available image area of the corresponding column and a chromatic pixel count number N2 in the end line of the available image area to the memory 532 based on this information. A difference of two count numbers inputted from the memory 532 is calculated to determine the chromatic pixel count number in the available image area, and it is determined whether the document is a chromatic document or an achromatic document by comparing it with the threshold value, and the determination result is outputted. As the threshold value THcolor_d, the number of pixels with a size in about 1 square cm is used with respect to an inputted document, for example. Since the value of threshold value THcolor_d changes with a resolution of the image input apparatus 3, it is set according to the resolution. For example, when the resolution is 1200 dpi, it is set to a value of about THcolor_d=240000. Subsequently, when the count number is equal to the threshold value THcolor_d or more, it is determined to be a chromatic document, and when not, it is determined to be an achromatic document.

Sums of the available image areas 11-13 are summed as following equations when the count numbers per line are stored for each column as shown in FIG. 18.

The chromatic pixel count number in the available image area 11=N(A, n)+N(B, n)+N(C, n)+N(D, n)+N(E, n).

The chromatic pixel count number in the available image area 12=N(B, b)−N(B, a-1)+N(B, d)−N(B, c-1)+N(C, b)−N(C, a-1)+N(C, d)−N(C, c-1)+N(D, b)−N(D, a-1)+N(D, d)−N(D, c-1).

The chromatic pixel count number in the available image area 13=N(B, b)−N(B, a-1)+N(B, d)−N(B, c-1)+N(D, b)−N(D, a-1)+N(D, d)−N(D, c-1).

In the aforementioned equations, a-d and n represent the lines shown in FIG. 16 and FIG. 17, A-E represent the columns shown in FIG. 18, and N represents the count number of the pixel in each column of the line up to a certain line.

Although the number of chromatic pixels is summed with respect to the whole document in the above-mentioned example, the count number may be summed for each further divided available image area in the case of the available image area 12 or the available image area 13. For example, two available image areas 12A and 12B obtained by dividing the available image area 12 will be as follows.

The chromatic pixel count number in the available image area 12A=N(B, b)−N(B, a-1)+N(C, b)−N(C, a-1)+N(D, b)−N(D, a-1).

The chromatic pixel count number in the available image area 12B=N(B, d)−N(B, c-1)+N(C, d)−N(C, c-1)+N(D, d)−N(D, c-1).

Figure 19:
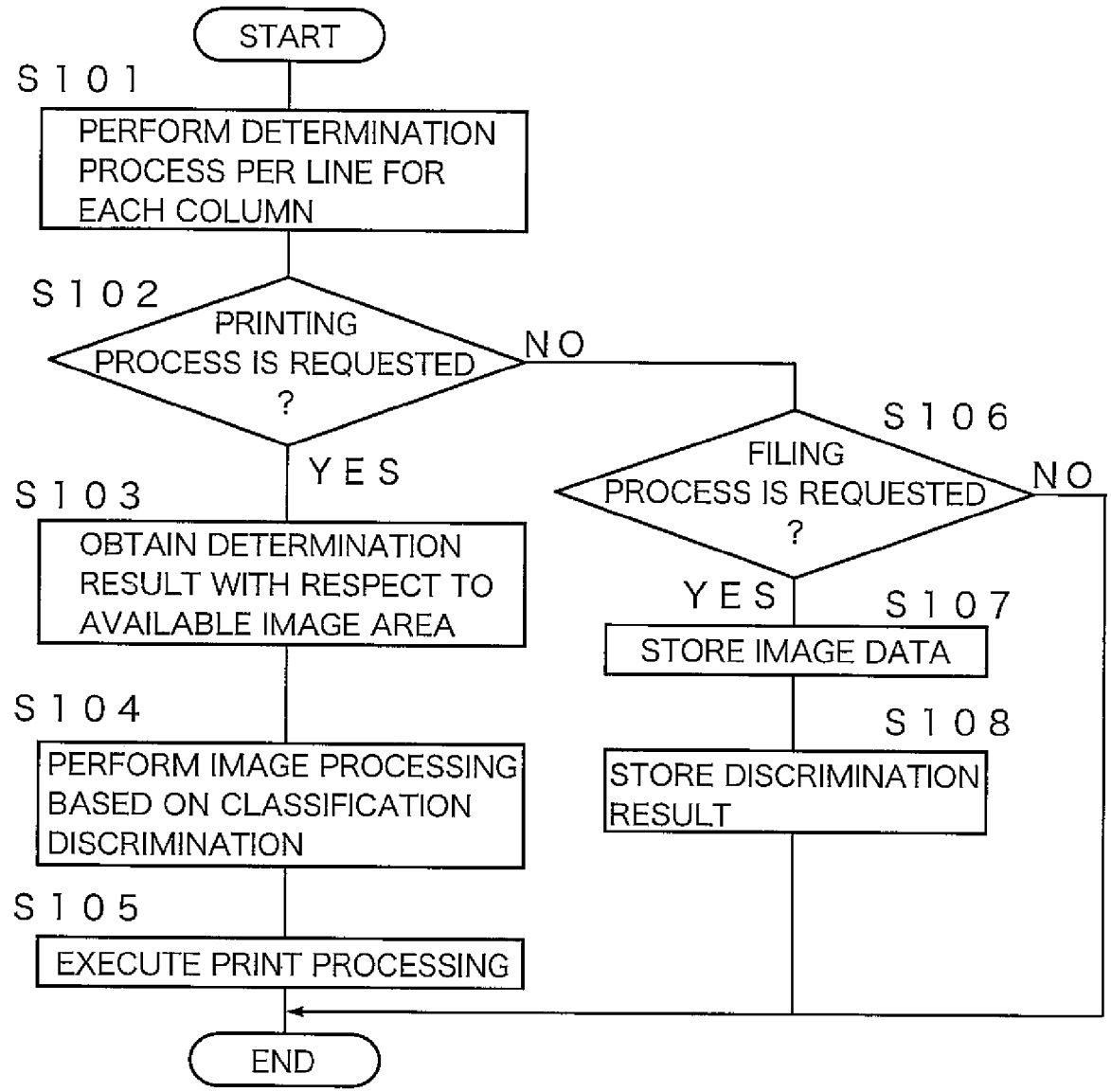
FIG. 19 is a flow chart illustrating a procedure at reading a document.

Hereinafter, contents of the processing executed using the determination result for each column will be described. FIG. 19 is a flow chart illustrating a procedure at reading the document. When the document scan is started and the image data for processing is inputted, the ACS determination process section 53 obtains a determination result per line for each column using the aforementioned method (Step S101). It is then determined whether or not a print processing is requested due to the setting at reading the document (Step S102).

When it is determined that the print processing is requested (S102: YES), the chromatic pixel count number is summed for each set available image area to obtain a determination result with respect to the available image area (Step S103). Image processing based on the classification discrimination is then performed (Step S104), and the print processing is executed (Step S105).

Meanwhile, when it is determined that the print processing is not requested at Step S102 (S102: NO), it is determined whether or not a filing process is requested due to the setting at reading the document (Step S106).

When it is determined that the filing process is requested (S106: YES), the image data and the determination result are stored in HDD which is not shown in the drawing (Step S107 and S108). Meanwhile, when it is determined that the filing process is not requested at Step S106 (S106: NO), the process according to the present flow chart will be completed.

Figure 20:
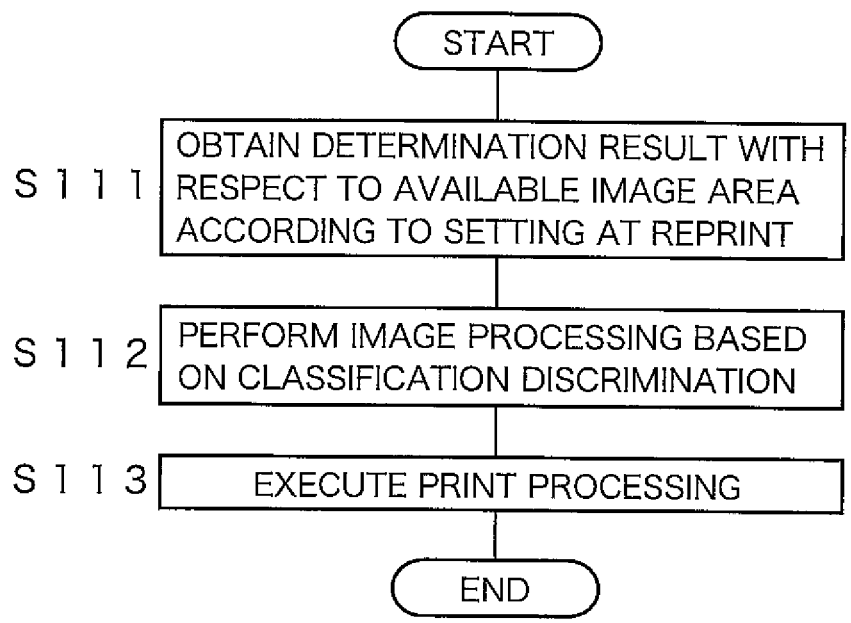
FIG. 20 is a flow chart illustrating a procedure at reprint.

FIG. 20 is a flow chart illustrating a procedure at reprint. First, a determination result with respect to the available image area is obtained according to the setting at reprint (Step S111), and image processing based on the classification determination is performed (Step S112). Next, the print processing is executed based on the image to which the image processing is performed (Step S113).

Note that although there is employed such a configuration that the processing to determine a chromatic document or an achromatic document from the count number per line is performed by the chromatic document determination section 535 in the present embodiment, a configuration for the CPU 531 to perform it may be employed. The configuration of the ACS determination process section 53 in this case is the same as that shown in FIG. 11.

Third Embodiment

It is also possible to use methods described hereinafter as the generation method and the sum method of the count number per line.

When the chromatic pixel flag inputted from the chromatic pixel determination section 533 indicates it is a chromatic pixel, the chromatic pixel count section 534 increments the count number by 1 with respect to each of respective available image areas of the image data to be set in advance, and when the flag indicates it is not a chromatic pixel, the count number remains as it is. Whenever the count of one line is performed, the chromatic pixel count number up to now is outputted to the memory 532. At this time, initialization of the counter is performed at the document read start position but not performed for each line. The count number of the chromatic pixel will always be a total sum from a document read start line.

Note herein that, the available image area is determined by a mode selected at scanning or a mode selectable at rework. Supposing that modes of the available image areas 11-13 as shown in FIG. 15 through FIG. 17 are selectable, the count numbers per line with respect to three available image areas are generated in parallel as shown in FIGS. 21A to 21C to be then stored in the memory 532.

The chromatic pixel count number is sequentially stored in the memory 532 per line. Additionally, the count number of the line requested from the chromatic pixel determination section 533 is outputted to the chromatic document determination section 535.

The chromatic document determination section 535, receives the available image area information from the CPU 531, and requests a chromatic pixel count number in one previous line of the corresponding available image area and a chromatic pixel count number in the end line of the available image area to the memory 532 based on this information, A difference of two count numbers inputted from the memory 532 is calculated to determine the chromatic pixel count number in the available image area, and it is determined whether the document is a chromatic document or an achromatic document by comparing it with the threshold value, and the determination result is outputted. As the threshold value THcolor_d, the number of pixels in a size of about 1 square cm is used with respect to an inputted document, for example. Since the value of threshold value THcolor_d changes with a resolution of the image input apparatus, it is set according to the resolution. Subsequently, when the count number is equal to the threshold value THcolor_d or more, it is determined to be a chromatic document, and when not, it is determined to be an achromatic document.

Figure 21A:
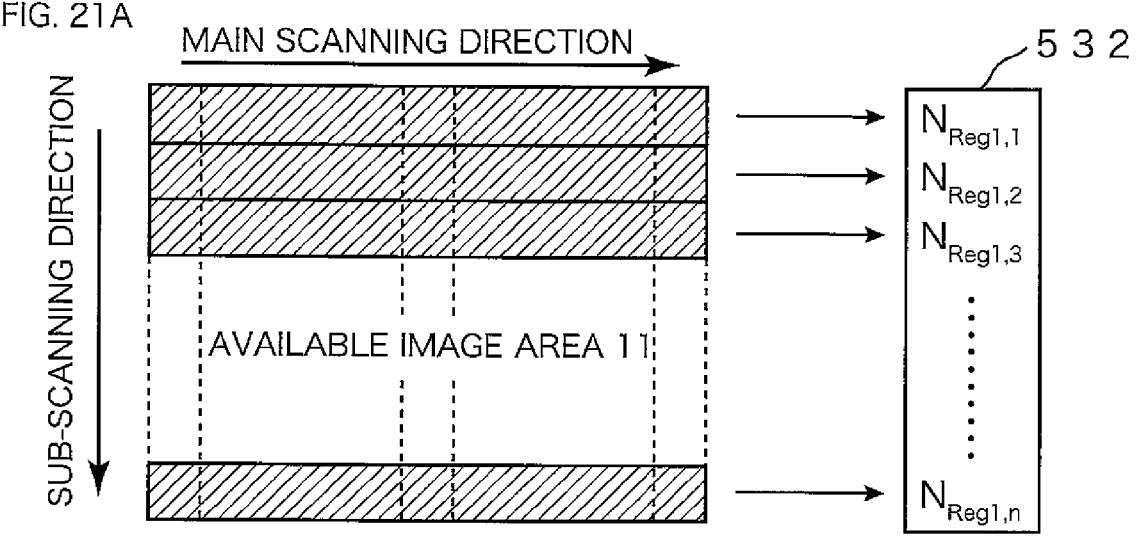
FIGS. 21A to 21C are schematic views showing examples of storing the chromatic pixel count number in the memory.
Figure 21B:
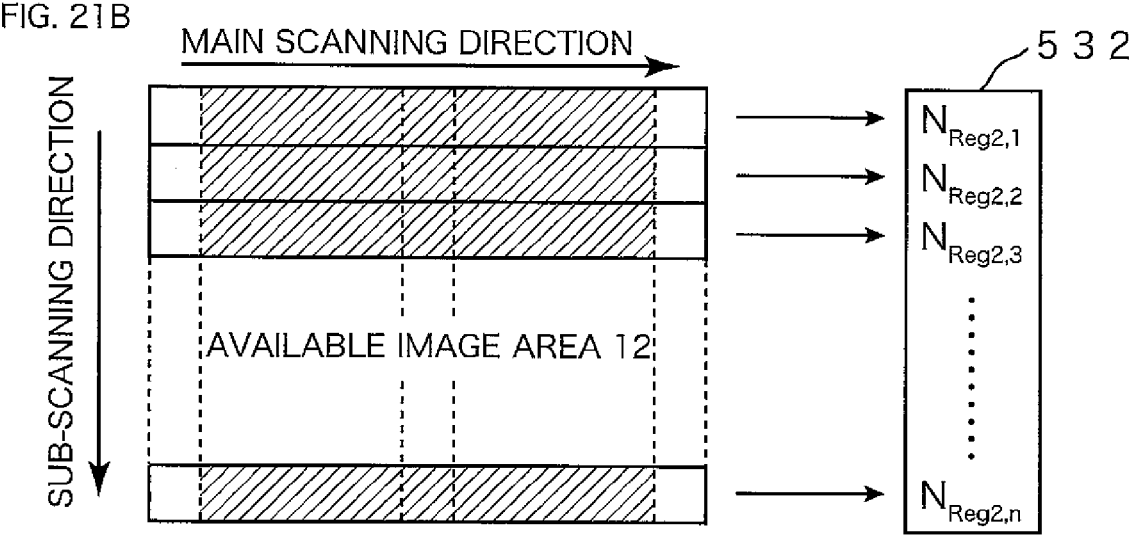
Figure 21C:
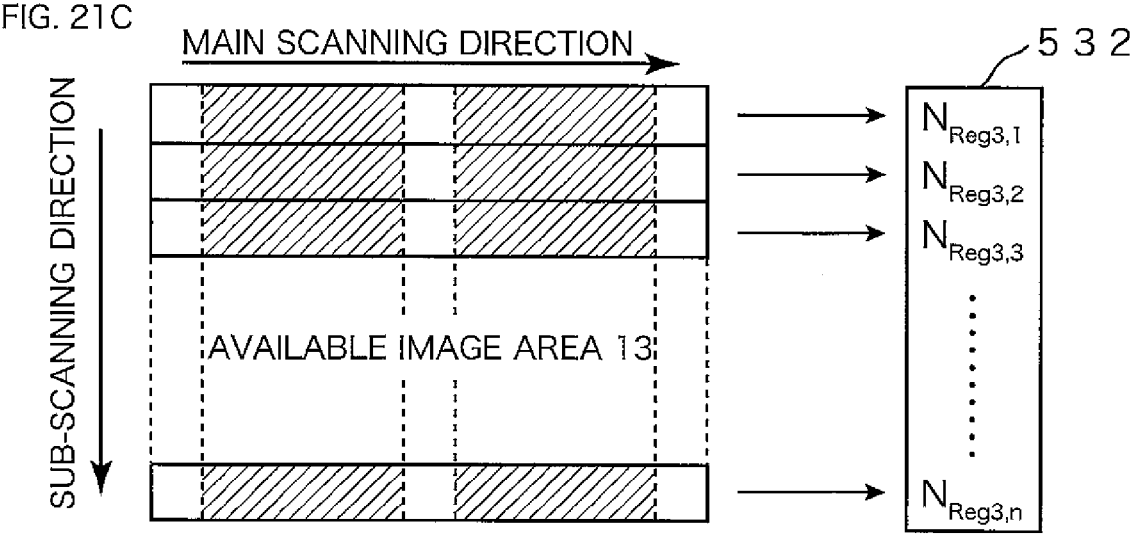

Sums of the available image areas 11-13 are summed as following equations when the count numbers per line are stored as shown in FIGS. 21A to 21B, for example.

The chromatic pixel count number in the available image area $11 = N(Reg1, n)$.

The chromatic pixel count number in the available image area $12 = N(Reg2, b) - N(Reg2, a-1) + N(Reg2, d) - N(Reg2, c-1)$.

The chromatic pixel count number in the available image area $13 = N(Reg3, b) - N(Reg3, a-1) + N(Reg3, d) - N(Reg3, c-1)$.

Note herein that, although there is employed such a configuration that the processing to determine a chromatic document or an achromatic document from the count number per line is performed by the chromatic document determination section 535 in the present embodiment, a configuration for the CPU 531 to perform it may be employed. The configuration of the ACS determination process section 53 in this case is the same as that shown in FIG. 11.

Additionally, although the example of determining whether it is a chromatic document or an achromatic document is shown in the above, it may be applied to document type determination processing and background determination processing which will be described later, or the aforementioned processes are suitably combined with each other to be applied to the processing.

Fourth Embodiment

Figure 22:
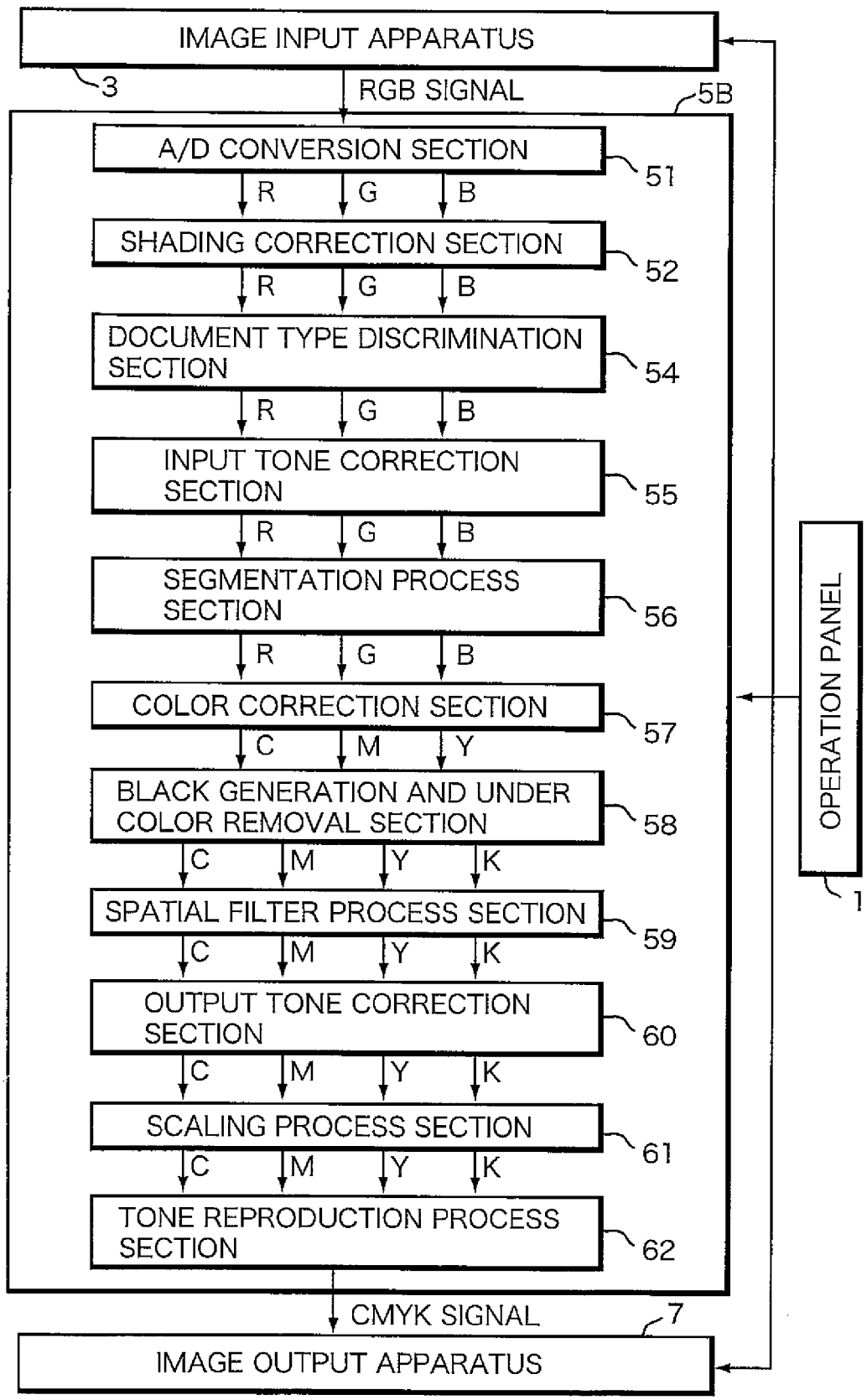
FIG. 22 is a block diagram illustrating an internal configuration of an image processing system provided with the image processing apparatus in accordance with the present embodiment.

FIG. 22 is a block diagram illustrating an internal configuration of an image processing system provided with the image processing apparatus in accordance with the present embodiment. The image processing system according to the fourth embodiment is provided with the operation panel 1, the image input apparatus 3, an image processing apparatus 5B, and an image output apparatus 7. The configuration except the image processing apparatus 5B is completely the same as that of the first embodiment, and description thereof will be omitted.

Figure 23:
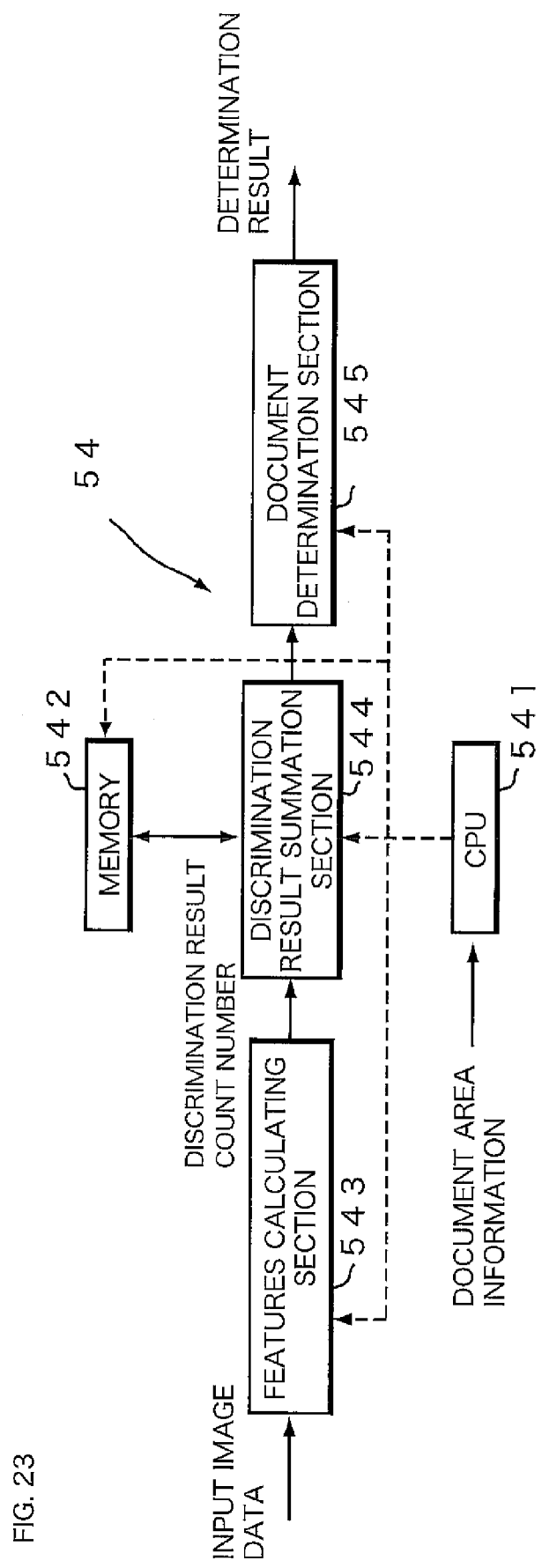
FIG. 23 is a block diagram showing an internal configuration of a document-type determination section.

The image processing apparatus 5B is provided with a document type discrimination section 54 instead of the ACS determination process section 53 of the image processing apparatus 5A described in the first embodiment. The document type discrimination section 54 also converts RGB reflectance signal into RGB density signal. FIG. 23 is a block diagram showing an internal configuration of the document type discrimination section 54. The document type discrimination section 54 is provided with a CPU 541, a memory 542, features calculating section 543, a discrimination result summation section 544, and a document determination section 545.

The features calculating section 543 calculates features, such as a busyness, the number of density transition, or the like to determine a classification of the document by the pixel unit (or the block unit) with respect to the inputted image data (density data), and discriminates the pixel by threshold value processing or the like to then output the discrimination result to the discrimination result summation section 544. The features calculating section 543 may generate one or a plurality of discrimination results. For example, when the busyness with respect to 7*7 mask is equal to a threshold value or more, it is discriminated as a text candidate pixel, and if not, the discrimination result that it is not the text candidate pixel is outputted, and in addition to that, when the frequency of reversal with respect to 7*7 mask is equal to a threshold value or less it is discriminated as a background candidate pixel, and When not, the discrimination result that it is not the background candidate pixel may be outputted.

The discrimination result summation section 544 increments the count number by 1 for each discrimination result inputted from the features calculating section 543. At this time, a value of the discrimination result itself may be added as the count number, or a value obtained by data-compressing the discrimination result (for example, a quantized value and a logarithmic transformation value) may be added as the count number. Whenever the count of one line is performed, the discrimination result count number up to now is outputted to the memory. At this time, initialization of the counter is performed at the document read start position, and it is not performed for each line. The count number will always be a total sum from the document read start position.

The memory 542 sequentially stores the discrimination result count number in the memory per line. Additionally, the count number of the line requested from the document determination section 545 is outputted to the document determination section 545. The document determination section 545 receives the available image area information from the CPU 541, and requests a discrimination result count number in one previous line of the available image area and a discrimination result count number in the end line of the available image area to the memory 542 based on this information. A difference of two count numbers inputted from the memory 542 is calculated to determine the discrimination result count number in the available image area, and it is determined what type of the document is by comparing it with the threshold value, and the determination result is outputted.

Figure 24:
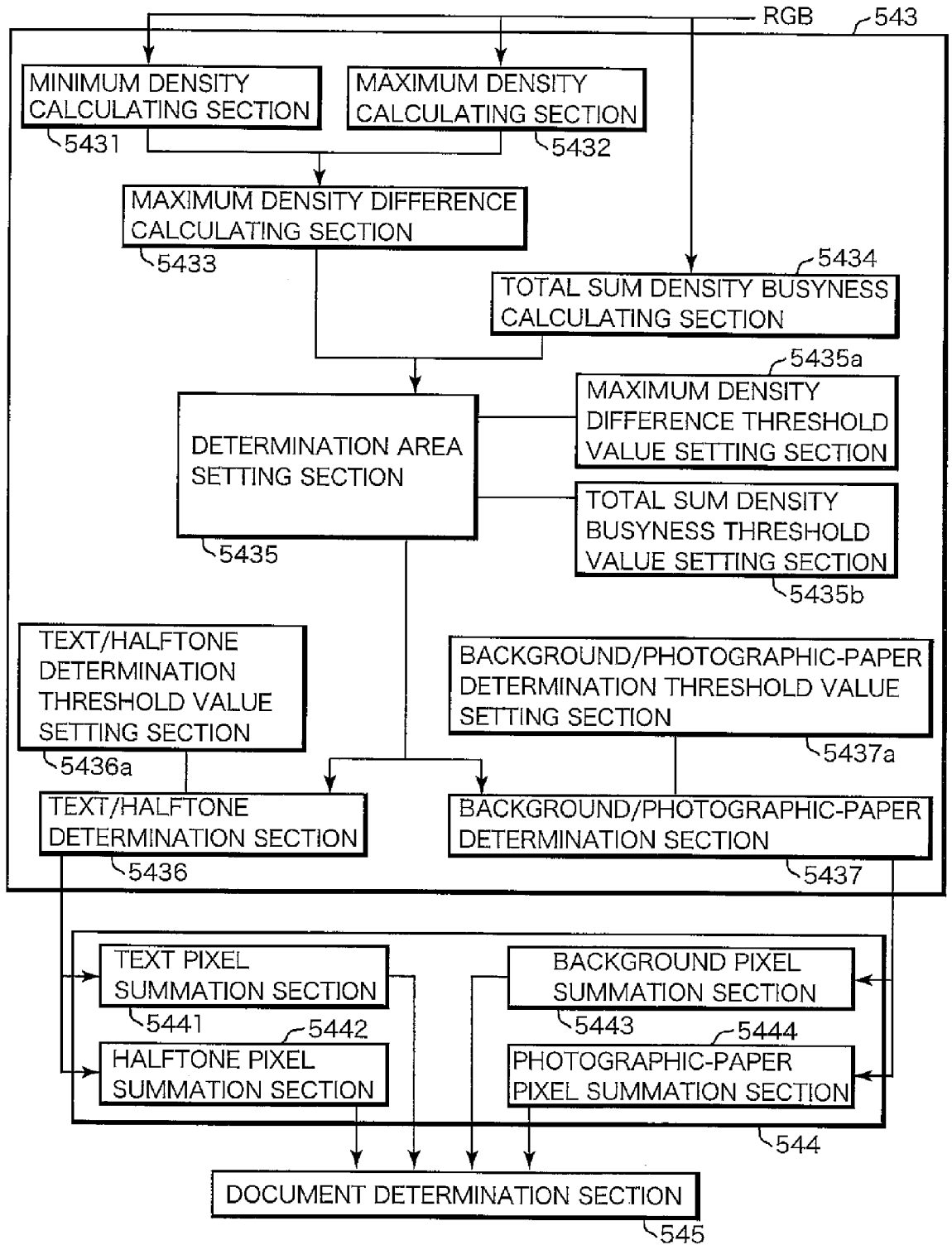
FIG. 24 is a block diagram showing details of features calculating section and a discrimination result summation section.

The determining method described in Japanese Patent Application Laid Open No. 2002-232708 can be used for determining the document type. FIG. 24 is a block diagram showing details of the features calculating section 543 and the discrimination result summation section 544.

The features calculating section 543 is provided with a minimum density calculating section 5431, a maximum density calculating section 5432, a maximum density difference calculating section 5433, a total sum density busyness calculating section 5434, a determination area setting section 5435, a maximum density difference threshold value setting section 5435a, a total sum density busyness threshold value setting section 5435b, a text/halftone determination section 5436, a text/halftone determination threshold value setting section 5436a, a background/photographic-paper determination section 5437, and a background/photographic-paper determination threshold value setting section 5437a.

The minimum density calculating section 5431 calculates a minimum value of the density in a block of n*m (for example, 5*15 pixels) including current pixels based on the CMY signals converted by a signal conversion section which is not shown), and The maximum density calculating section 5432 calculates a maximum value of the density in a block of n*m (for example, 5*15 pixels) including current pixels based on the CMY signals to be inputted. The maximum density difference calculating section 5433 calculates a maximum density difference using the minimum density and maximum density which are calculated by the minimum density calculating section 5431 and the maximum density calculating section 5432, respectively.

The total sum density busyness calculating section 5434 determines total sums of absolute values of density differences between adjacent pixels in the main scanning direction and the sub-scanning direction in the aforementioned block of n*m (for example, 5*15 pixels), respectively, and calculates a sum of the total sum in the main scanning direction and the sub-scanning direction. The determination area setting section 5435 separates the area into a background/photographic-paper (photograph) component, and a text/halftone component based on the maximum density difference calculated by the maximum density difference calculating section 5433, the threshold value of the maximum density difference set by the maximum density difference threshold value setting section 5435a, the total sum density busyness calculated by the total sum density busyness calculating section 5434, and the threshold value of the total sum density busyness set by the total sum density busyness threshold value setting section 5435b.

The text/halftone determination section 5436 determines whether the pixel in the area divided into the text/halftone component by the determination area setting section 5435 is a text pixel or a halftone pixel. The threshold value set by the text/halftone determination threshold value setting section 5436a is used for the determination. A result thereof is outputted to the discrimination result summation section 544. A text pixel summation section 5441 of the discrimination result summation section 544 sums pixels determined to be the text, while a halftone pixel summation section 5442 thereof sums pixels determined to be the halftone.

The background/photographic-paper determination section 5437 determines whether the pixel in the area divided into the background/photographic-paper component by the determination area setting section 5435 is the background or the photographic-paper (photographic-picture). The threshold value set by the background/photographic-paper determination threshold value setting section 5437a is used for the determination. A result thereof is outputted to the discrimination result summation section 544. A background pixel summation section 5443 sums the pixels determined to be the background, while a photographic-paper pixel summation section 5444 sums the pixels determined to be the photographic-paper.

Figure 25:
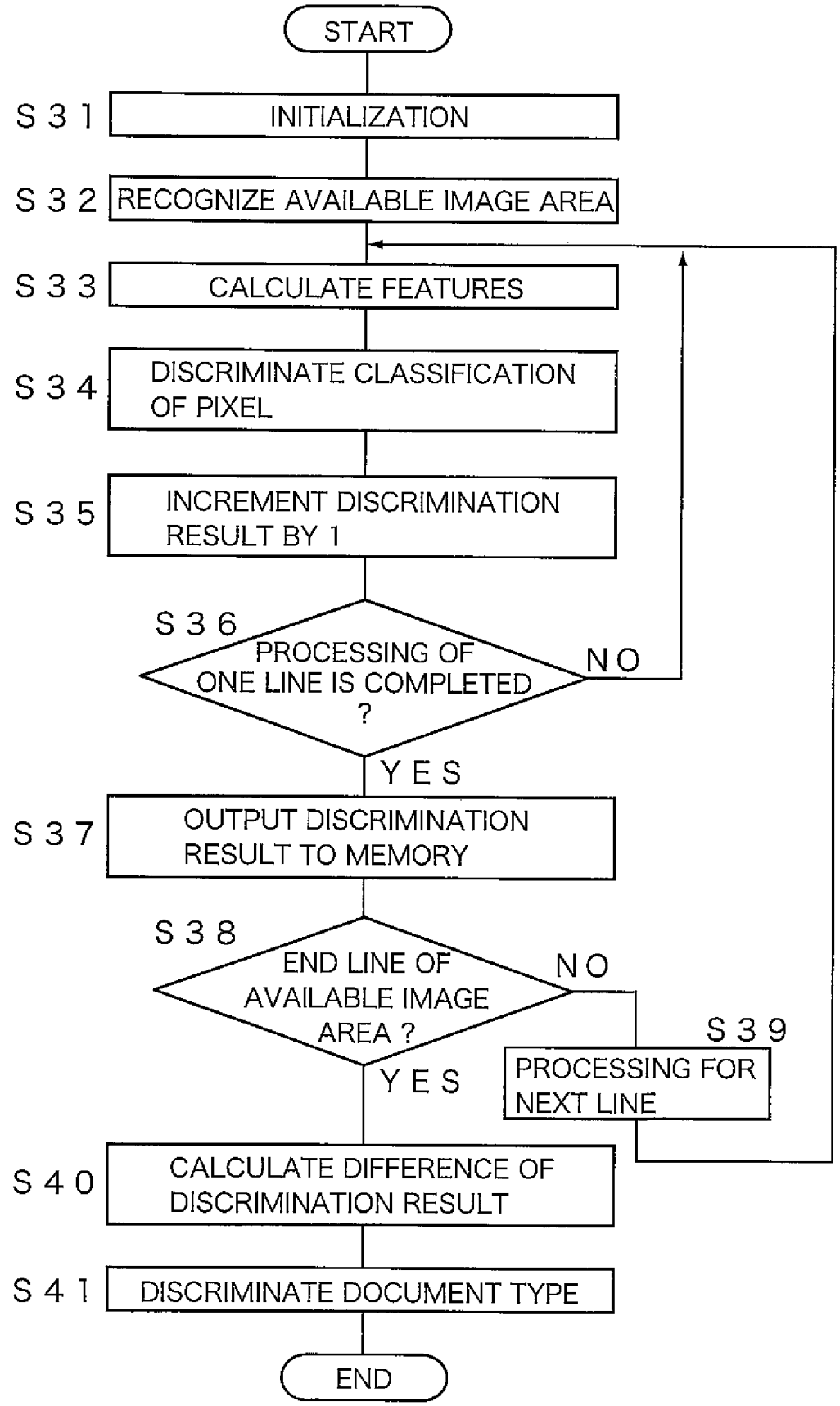
FIG. 25 is a flow chart illustrating a procedure that the document-type determination section executes.
Figure 26:
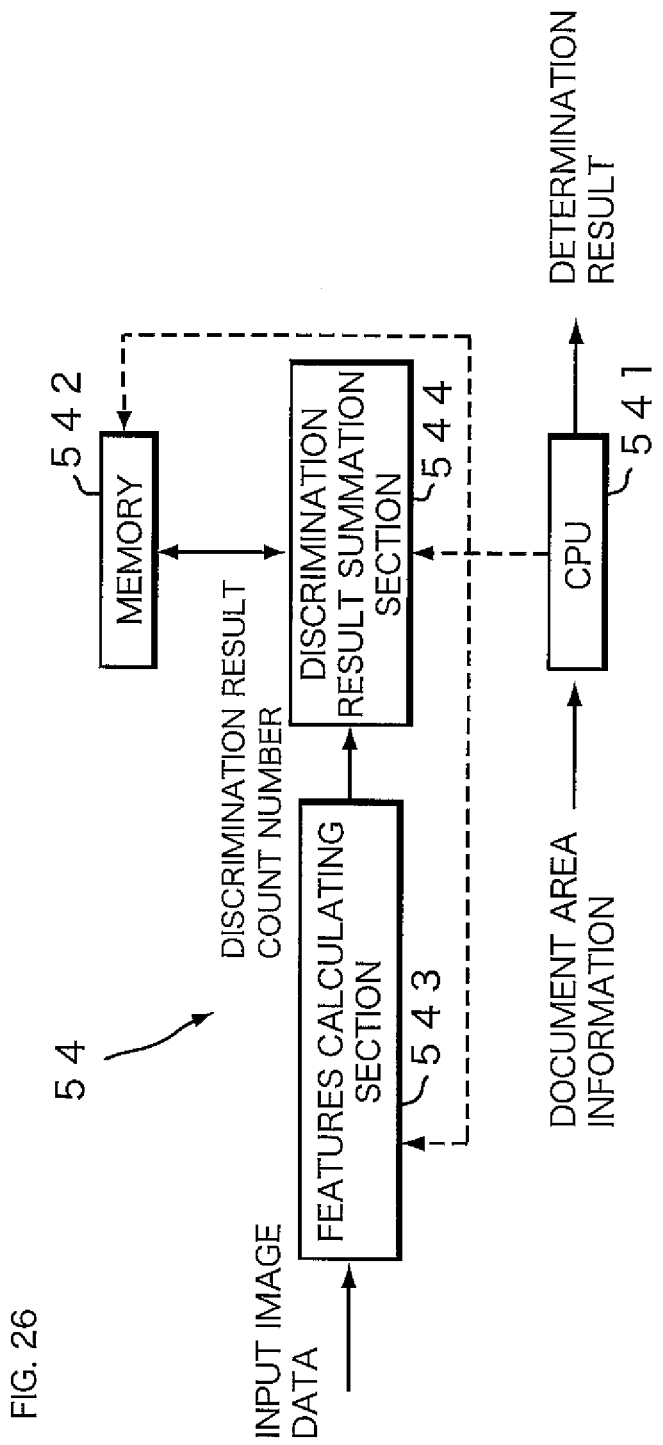
FIG. 26 is a block diagram showing a modified example of the document-type determination section.

FIG. 25 is a flow chart illustrating a procedure that the document type discrimination section 54 executes. The CPU 541 first initializes the count number or the like stored in the memory (Step S31). It then recognizes the document size from the information on the read start position and the read end position of the document notified from the image input apparatus 3, and acquires and analyzes the information including the scaling, the processing object position, or the like for performing the image processing to the document inputted from the operation panel 1 or the like to then recognize it as the available image area information (Step S32).

Next, the features calculating section 543 calculates features by the pixel unit in one line (Step S33), and discriminates the classification of the pixel (Step S34). It then increments the value of the counter by 1 according to the discrimination result (Step S35), and determines whether or not processing of one line is completed (Step S36). When it is determined that the processing of one line is not completed (S36: NO), the process is returned to Step S33.

When it is determined that the processing of one line is completed (S36: YES), the discrimination result of one line is outputted to the memory 542 (Step S37). Next, the CPU 541 determines whether or not it is the end line of the available image area (Step S38), and then when it is determined not to be the end line (S38: NO), it perform processing of the next line (Step S39), and the process is returned to Step S33.

When it is determined that the current line is the end line of the available image area (S38: YES), a difference (the number of pixels determined to be the text, the number of pixels determined to be the halftone, the number of pixels determined to be the background, the difference between the numbers of pixels determined to be the photographic-paper) between the discrimination result of one previous line of the available image area and the discrimination result in the end line of the available image area is calculated (Step S40), and the document type is discriminated based on the calculated difference (Step S41). For example, a ratio of the number of pixels for each area described above to the total number of pixels of the available image area is determined to be compared with the threshold value defined to the text component, the halftone component, the photographic-picture component, and the page background component, and thus the document type of the available image area is determined. For example, when both of the ratios of the number of pixels determined to be the text and the number of pixels determined to be the halftone are equal to respective threshold values or more, it is determined to be the text printed photograph document.

The aforementioned threshold value can be set as follows. Assuming that detection accuracy is higher in the order of, for example, the text, the halftone, and the photographic-paper, it is determined as the text document when the ratio of the pixels determined to be the text is more than or equal to 30% (threshold value 30%) to the total number of pixels of the available image area, as the halftone document (printed photograph document) when the ratio of the pixels determined to be the halftone is more than or equal to 20% (threshold value 20%) to the total number of pixels of the available image area; and as the photographic-paper document when the ratio of the pixels determined to be the photographic-paper is more than or equal to 10% (threshold value 10%) to the total number of pixels of the available image area.

Figure 27:
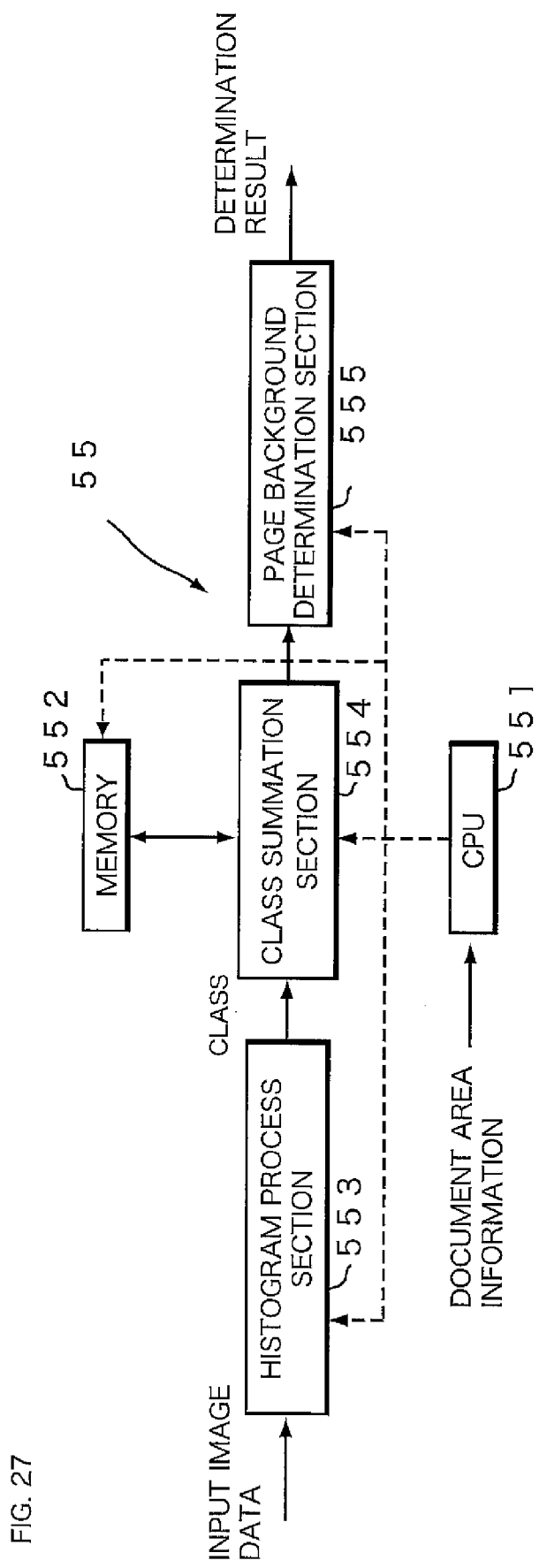
FIG. 27 is a block diagram showing an internal configuration of an input tone correction section in the image processing apparatus shown in FIG. 4.

Note that, although there is employed such a configuration that the document type is determined by the document determination section 545 in the present embodiment, a configuration for the CPU 541 to perform it may be employed. FIG. 27 is a block diagram showing a modified example of the document type discrimination section 54.

Fifth Embodiment

Application examples to the background determination processing will be described in the present embodiment. FIG. 27 is a block diagram showing an internal configuration of the input tone correction section 55 in the image processing apparatus 5A shown in FIG. 4. The input tone correction section 55 is provided with a CPU 551, a memory 552, a histogram process section 553, a class summation section 554, and a page background determination section 555.

The CPU 551 recognizes a document size from information on a read start position and a read end position of the document notified from the image input apparatus 3. Additionally, it acquires and analyzes information on the scaling, the processing object position, or the like for performing the image processing with respect to the document inputted from the operation panel 1 or the like to thereby recognize it as the available image area information.

The histogram process section 553 determines in which classes of a histogram the inputted image data is included by performing threshold value determination processing to a density by the pixel unit (or the block unit), and outputs the class to the class summation section 554. At this time, a class determined to be the background is defined in advance, and only corresponding classes are outputted to the class summation section 554. Namely, background candidate pixels are extracted.

The class summation section 554 performs count processing to the class of the background candidate pixel inputted from the histogram process section 553, and increments the count number corresponding to the inputted class by 1. Whenever the count of one line is performed, the count number with respect to each class up to now is outputted to the memory 552. At this time, initialization of the counter is performed at the document read start position, and it is not performed for each line. The count number will always be a total sum from the document read start position.

The memory 552 sequentially stores the count number with respect to each class of the histogram in the memory 552 per line. Additionally, the count number of the line requested from the page background determination section 555 is outputted to the page background determination section 555.

The page background determination section 555 receives the available image area information from the CPU 551, and requests the count number with respect to each class of the histogram in one previous line of the available image area, and the count number with respect to each class of the histogram in the end line of the available image area to the memory 552 based on this information. A difference between two count numbers inputted from the memory 552 is calculated with respect to respective classes, the count number with respect to each class of the histogram in the available image area is determined, and the background of the document is determined by comparing it with the threshold value for each color component to thereby output a determination result. The class determined to be the background and the threshold value for comparing with the count number are determined so that the background can be appropriately extracted using various image samples.

Although only the class determined to be the background is counted in the above example, all the classes may be counted, and a difference between the count values with respect to only the classes determined to be the background may be determined to thereby determine the background.

Figure 28:
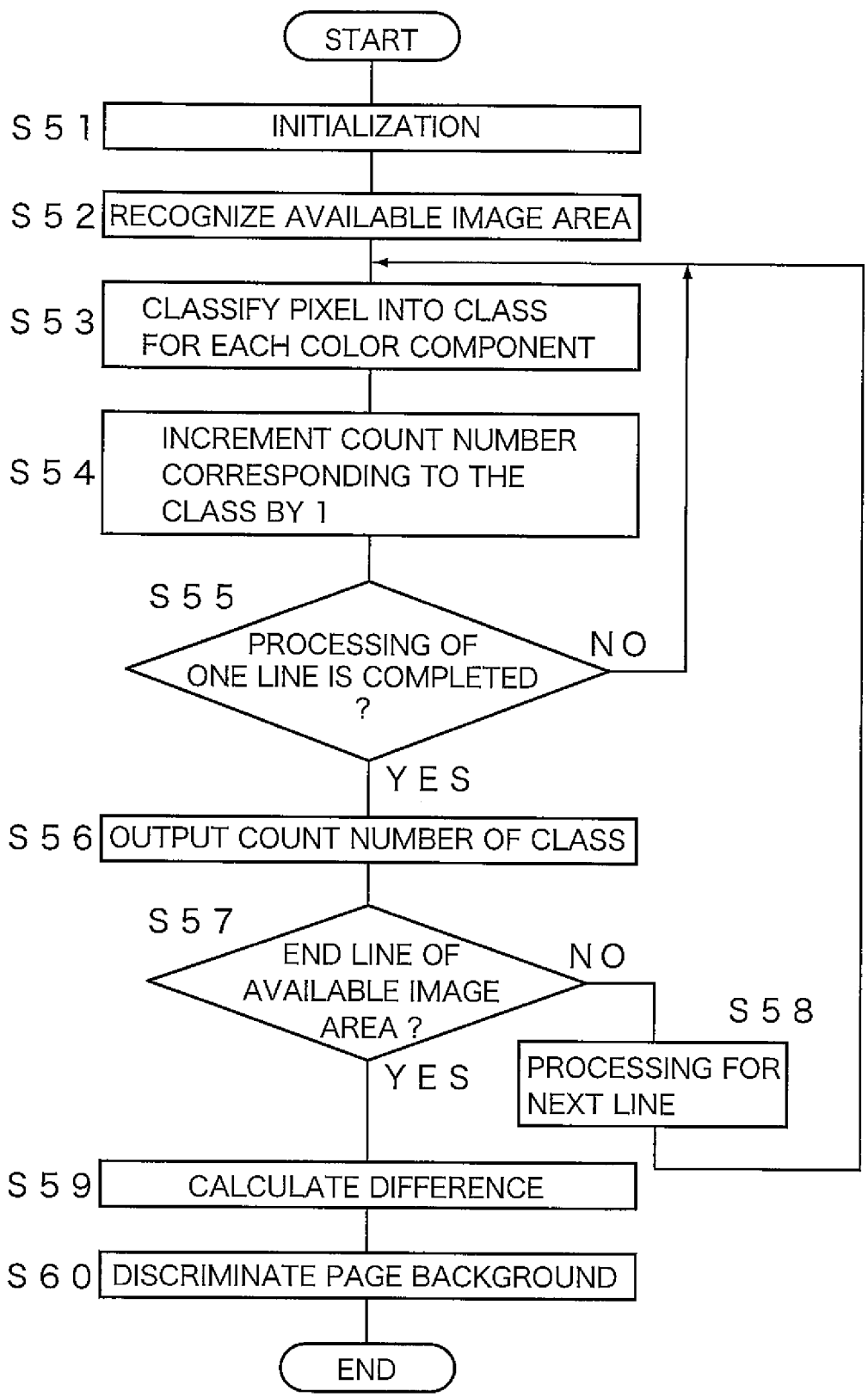
FIG. 28 is a flow chart illustrating a procedure that the input tone correction section executes.

FIG. 28 is a flow chart illustrating a procedure that the input tone correction section 55 executes. The CPU 551 first initializes the count number or the like stored in the memory (Step S51). It then recognizes the document size from the information on the read start position and the read end position of the document notified from the image input apparatus 3, and acquires and analyzes the information including the scaling, the processing object position, or the like for performing the image processing to the document inputted from the operation panel 1 or the like to then recognize it as the available image area information (Step S52).

Next, the histogram process section 553 performs processing by the pixel unit in one line, classifies the pixel into the class for each color component (Step S53), and increments the count number corresponding to the class by 1 (Step S54).

The CPU 551 determines whether or not the processing of one line is completed (Step S55), and when it is determined that the processing of one line is not completed (S55: NO), the process is returned to Step S53.

When it is determined that the processing of one line is completed (S55: YES), the count number of the class of one line is outputted to the memory 552 for each color component (Step S56). Subsequently, the CPU 541 determines whether or not the line is the end line of the available image area (Step S57), and when it is determined not to be the end line (S57: NO), it perform processing of the next line (Step S58), and the process is returned to Step S53.

When it is determined that the current line is the end line of the available image area (S57: YES), a difference between the count number of the class in one previous line of the available image area and the count number of the class in the end line of the available image area is calculated for each color component (Step S59). Subsequently, a value of the largest class (in the case of RGB signals) among the color components in which the count number is equal to the threshold value or more is determined to be the background (Step S60). Background removal processing is then performed based on the discrimination result of the background.

Following methods described in, for example, Japanese Patent Application Laid Open No. 2000-354167 may be used as a discrimination method of the background. Namely, first, an M signal that is a complementary color transformation signal of a G signal is extracted from inputted image data, and for example, 256 steps of density are divided into 16 to thereby create the histogram. Density divisions (classes) equal to the maximum value of the density determined to be the background (first threshold value) or less are counted to determine a counted value difference, and density divisions with the difference equal to the threshold value or more is extracted as the background. A compensation amount table corresponding to the extracted density division value is then selected, and the background removal processing is performed. Incidentally, it may be performed using a luminance signal (255−Y; where Y is Yj=0.30 Rj+0.59 Gi+0.11 Bj (Rj, Gj, Bj: color component of each pixel)) instead of the G signal.

Figure 29:
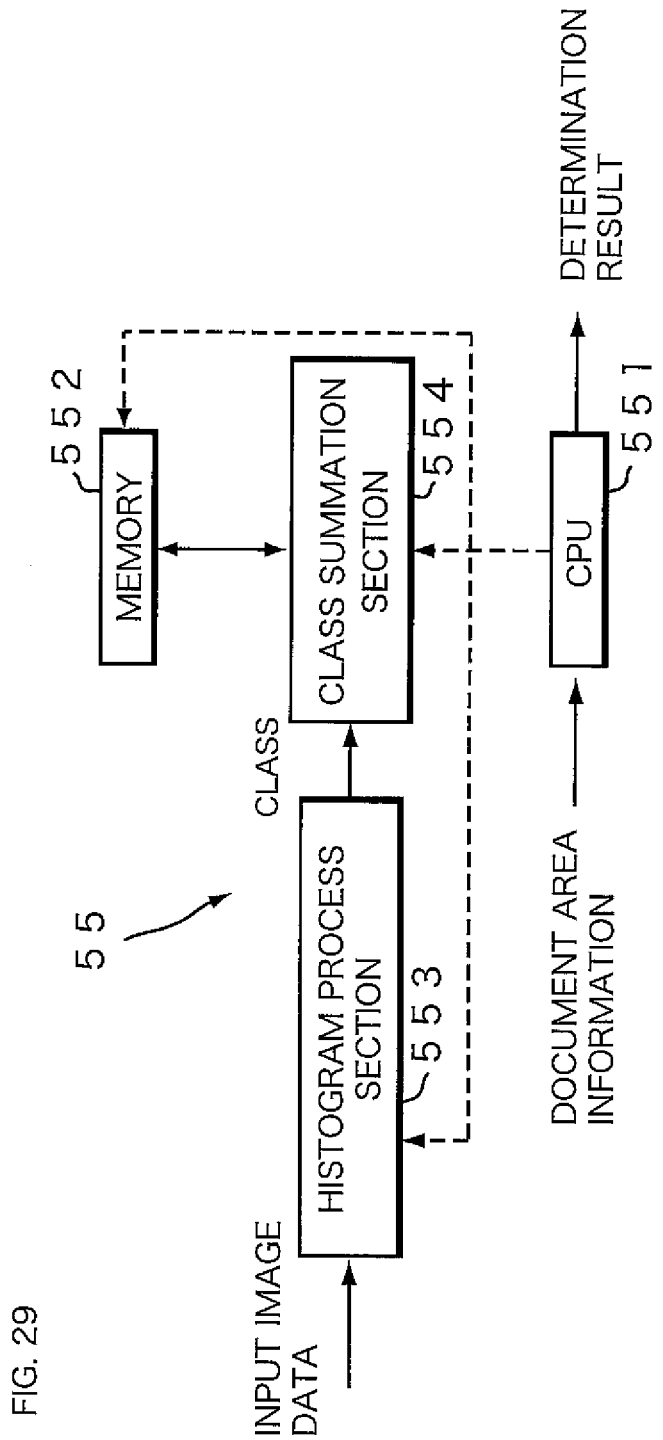
FIG. 29 is a block diagram showing a modified example of the input tone correction section.

Note that, although there is employed such a configuration that the background is determined by the page background determination section 555 in the present embodiment, a configuration for the CPU 551 to perform it may be employed. FIG. 29 is a block diagram showing a modified example of the input tone correction section 55.

Although an example of individually performing the auto color selection processing, the discrimination processing of the document type, and the background determination processing has been described in the above, these processings may be suitably combined. For example, the auto color selection processing and the discrimination processing of the document type may be performed in parallel, and the discrimination result of the chromatic or achromatic document and the discrimination result of the document type may be outputted in combination. Further, the background determination processing may be performed after performing the auto color selection processing and the discrimination processing of the document type. At this time, for example, when the text document is included (text document, text printing photograph document, text photographic-paper document, or the like), the background determination processing may be performed based on the determination result of the document type, and when the text document is not included (printing photograph document, photographic-paper document, or the like), the background determination processing may not be performed. The reason is that when the text document is included, the background is usually included, but the background is hardly included in the photograph document in which the text is not included. Furthermore, the processing sequence of the auto color selection processing, the discrimination processing of the document type, and the background determination processing may be interchanged, or a part or all of them may be processed by the CPU.

Sixth Embodiment

Figure 30:
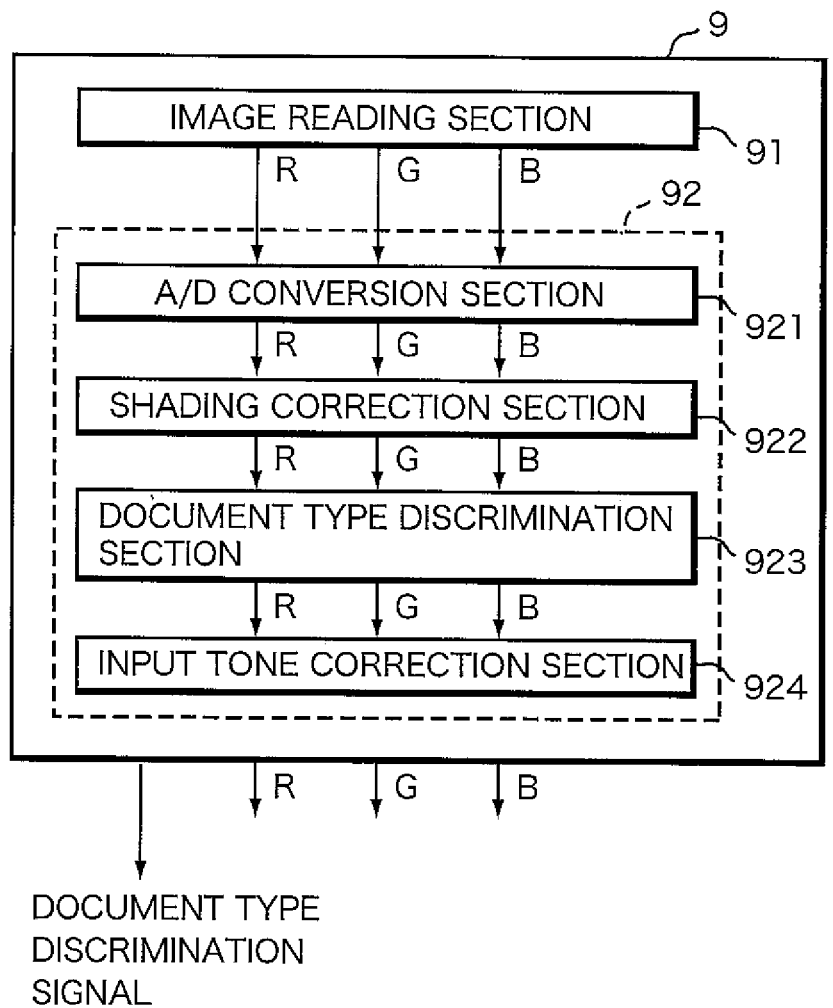
FIG. 30 is a block diagram showing an internal configuration of the image reading apparatus in accordance with the present embodiment.

Application examples to an image reading apparatus will be described in the present embodiment. FIG. 30 is a block diagram showing an internal configuration of the image reading apparatus in accordance with the present embodiment. An image reading apparatus 9 in accordance with the present embodiment is provided with an image reading section 91 and an image processing section 92. The image reading section 91 is provided with a scanning unit for optically reading the image of the document, an imaging lens, a CCD line sensor, a feed timing sensor, and the like.

The image processing section 92 is provided with an A/D conversion section 921, a shading correction section 922, a document type discrimination section 923, and an input tone correction section 924. The A/D conversion section 921 converts analog signals read by the image reading section 91 into digital signals. The shading correction section 922 performs shading compensation for removing various distortion generated in the illuminating system, image focusing system, and image sensing system of the image reading section 91.

The document type discrimination section 923 converts the RGB signals in which various distortions are removed by the shading correction section 922 (reflectance signal of RGB) into signals that are easy for the image processing system to treat, such as density signals employed in the image processing apparatus, and also discriminates the document type, such that the inputted document image is a text document, a printing photograph copy document, or a photographic-paper, or a text/printing photograph document which combined them.

The input tone correction section 924, while arranging the color balance, detects the background, and performs image quality adjustment processing, such removal of background density, contrast, or the like.

The RGB signals to which the image processing is subjected in the image processing section 92, and document type discrimination signals are inputted into a computer or a printer, and processing according to the document type is made.

Note that, although an example provided with the document type discrimination section 923 is shown in the above, the ACS determination process section described in the first embodiment may be provided instead of the document-type determining section. Alternatively, it may be configured in such a way that the ACS determination processing is incorporated in the document type discrimination section 923, and the input tone correction section 924 further performs the background determination to then output the result therewith. Further, the image reading apparatus may have a configuration to be provided with the segmentation process section.

Seventh Embodiment although there is employed such a configuration that each processing is achieved by hardware in the first and second embodiments, a configuration in which the present application is achieved by processing of software may be employed.

Figure 31:
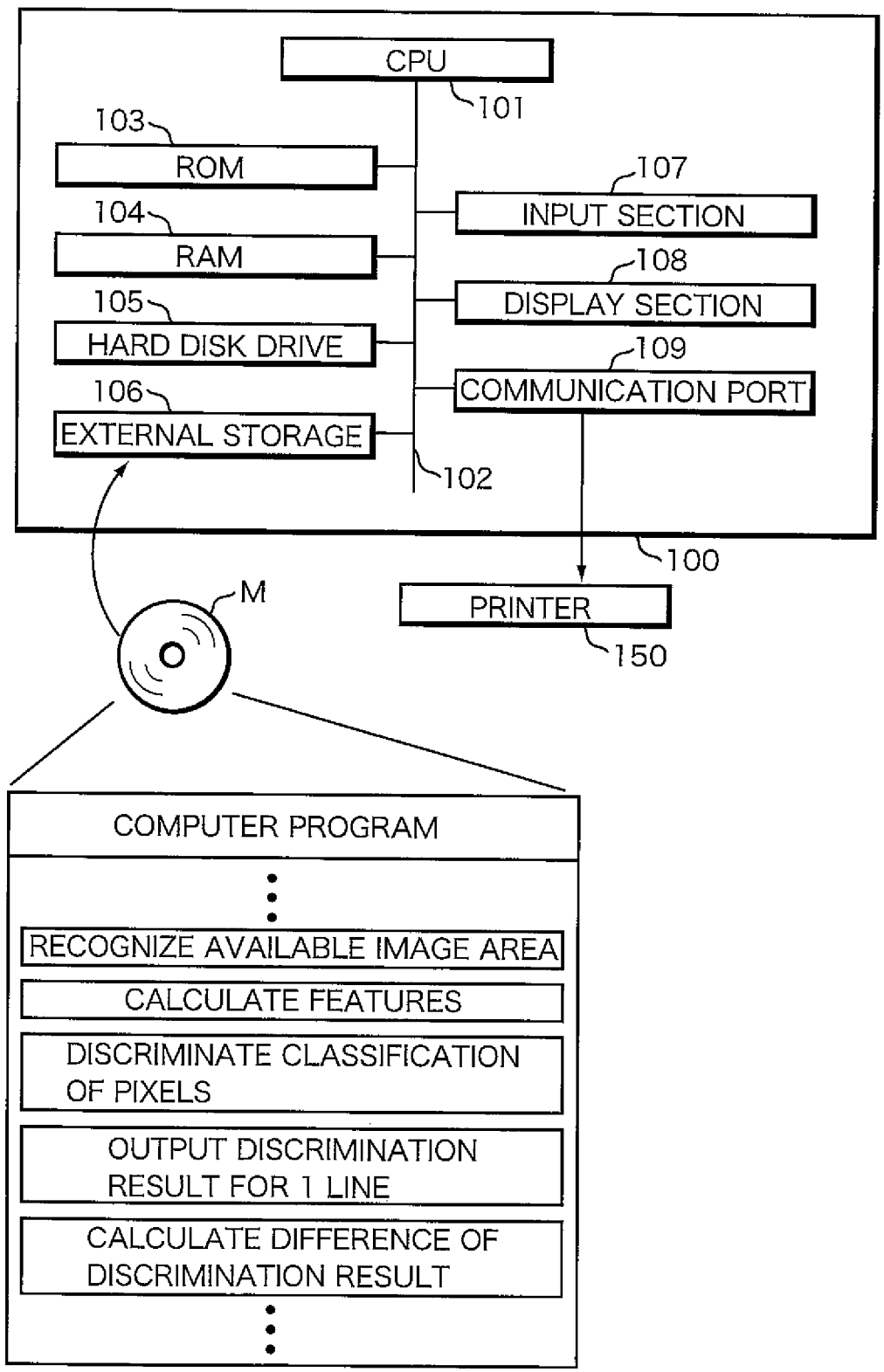
FIG. 31 is a block diagram illustrating the internal configuration of the image processing apparatus in which a computer program of the present embodiment is installed.

FIG. 31 is a block diagram illustrating the internal configuration of the image processing apparatus in which a computer program of the present embodiment is installed. In the drawing, reference numeral 100 represents an image processing apparatus in accordance with the present embodiment, and specifically, it is a personal computer, a workstation, or the like. The image processing apparatus 100 is provided with a CPU 101, wherein hardware, such as a ROM 103, a RAM 104, a hard disk 105, an external storage 106, an input section 107, a display section 108, a communication port 109, and the like is connected to the CPU 101 via a bus 102. The CPU 101 controls aforementioned each section of the hardware according to a control program stored in the ROM 103 in advance.

The RAM 104 is a volatile memory which temporarily stores the aforementioned control program, or various data generated during execution of program codes (an execute form program, an intermediate code program, a source program) of the computer program in accordance with the present application. The hard disk 105 is memory means having a magnetic recording medium, and the program codes of the computer program read from the recording medium of the present application, or the like is stored. The external storage 106 is provided with a reader for reading the program code from a recording medium M of the present application. FD (Flexible Disk), CD-ROM, or the like can be used as the recording medium M. The program codes read by the external storage 106 are stored in the hard disk 105. The CPU 101 operates all the apparatuses as a system for achieving the image processing described in the first through fifth embodiments by loading the program codes in accordance with the present application stored in the hard disk 105 on the RAM 104 to execute them.

The input section 107 functions as an interface for acquiring the image data from the outside. A color scanner apparatus or the like is connected to the input section 107, for example. The display section 108 functions as an interface for displaying the image data for processing, the image data under image processing, the image data after the image processing, or the like. It may be a configuration in which an external display apparatus, such as a liquid crystal display is connected to the display section 108 to thereby display the image data, or may be a configuration in which the display section 108 itself is provided with the display section to display the image data. The communication port 109 is an interface for connecting a printer 150 outside. When the image data to which the image processing is performed is printed by the printer 150, the image processing apparatus 100 generates print data which can be decoded by the printer 150 based on said image data, and transmits the generated print data to the printer 150.

Note that, although there is employed such a configuration that the CPU 101 executes various operations in the present embodiment, there may be employed such a configuration that a dedicated chip for performing an operation in accordance with the image processing is separately provided to then perform the operation based on instructions from the CPU 101.

Meanwhile, an optical disk, such as MO, MD, and DVD, a magnetic recording media, such as a hard disk, a card type recording media, such as an IC card, a memory card, and an optical card, a mask ROM, an EPROM (Erasable Programmable Read Only Memory), EEPROM (Electrically Erasable Programmable Read Only Memory), and a semiconductor memory such as a flash ROM are available as the recording medium M other than the above-mentioned FD and CD-ROM. Meanwhile, since it has a system configuration which can connect communication networks including the Internet, the computer program codes in accordance with the present application may be downloaded from the communication networks.

Moreover, it may be a form that the aforementioned computer program is provided as a stand-alone application program and utility program, or may be a form that it is incorporated in another application program and utility program to be provided as a function of a part of the program product. For example, a form that it is incorporated in a printer driver to be provided can be considered as one form. It should be noted that the present application could be achieved also with a form of computer data signals embedded in carriers, in which the aforementioned program codes are embodied by the electronic transmission.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method for discriminating a classification of an image and performing processing according to a discrimination result, comprising the steps of:
   sequentially reading an image for discrimination into a memory for each line composed of a plurality of pixels;
   calculating features of the pixels in the read line;
   discriminating a classification of the pixels based on the calculated features and counting the pixels whose classifications are discriminated;
   storing the total number of pixels whose classifications are discriminated from a line of a read start position to respective lines in the image;
   setting an area to be processed with respect to the image;
   calculating a difference between the total number of the pixels whose classifications are discriminated in respective lines from the line of the read start position to an end line in the set area, and the total number of the pixels whose classifications are discriminated in respective lines from the line of the read start position to a line just before the set area;
   discriminating a classification of said set area based on the calculated difference; and
   performing processing according to a discrimination result to the image in said set area.

2. An image processing method for discriminating a classification of an image and performing processing according to a discrimination result, comprising the steps of:
   sequentially reading an image for discrimination into a memory for each line composed of a plurality of pixels;
   calculating features of the pixels in the read line;
   discriminating a classification of the pixel based on the calculated features and counting the pixels whose classifications are discriminated, for each of available image areas set in advance in a main scanning direction;
   storing the total number of pixels whose classifications are discriminated from a line of a read start position to respective lines in the image for each of the available image areas set in advance;
   selecting an available image area, from the available image areas set in advance, to be processed with respect to the image;
   calculating a difference between the total number of the pixels whose classifications are discriminated in respective lines from the line of the read start position to an end line in the selected available image area, and the total number of the pixels whose classifications are discriminated in respective lines from the line of the read start position to a line just before the selected available image area;
   discriminating a classification of the selected available image area based on the calculated difference; and
   performing processing according to a discrimination result to the image in the selected available image area.

3. An image processing apparatus for discriminating a classification of an image and performing processing according to a discrimination result, comprising: a read section for sequentially reading an image for discrimination for each line composed of a plurality of pixels;
   a classification discrimination section for calculating features of the pixels in the read line and discriminating a classification of the pixel based on the calculated features;

a count section for counting the pixels whose classifications are discriminated; a storage for storing the total number of pixels whose classifications are discriminated from a line of a read start position to respective lines in the image;

an area setting section for setting an area to be processed with respect to said image;

a difference calculation section for calculating a difference between the total number of the pixels whose classifications are discriminated in respective lines from the line of the read start position to an end line in said set area, and the total number of the pixels whose classifications are discriminated in respective lines from the line of the read start position to a line just before the set area;

a feature discrimination section for discriminating a feature of said set area based on the calculated difference; and an image processing section for performing processing to the image in said set area according to a discrimination result obtained from the feature discrimination section.

4. An image processing apparatus for discriminating a classification of an image and performing processing according to a discrimination result, comprising: a read section for sequentially reading an image for discrimination for each line composed of a plurality of pixels;

a classification discrimination section for calculating features of the pixels in the read line and discriminating a classification of the pixel based on the calculated features;

a count section for counting the pixels whose classifications are discriminated, for each of available image areas set in advance in a main scanning direction;

a storage for storing the total number of pixels whose classifications are discriminated from a line of a read start position to respective lines in the image for each of the available image areas set in advance;

an area setting section for setting an available image area, from the available image areas set in advance, to be processed with respect to said image;

a calculation section for calculating a difference between the total number of the pixels whose classifications are discriminated in respective lines from the line of the read start position to an end line in the set available image area, and the total number of the pixels whose classifications are discriminated in respective lines from the line of the read start position to a line just before the set available image area;

a feature discrimination section for discriminating a feature of said set available image area based on calculated difference obtained from the calculation section; and an image processing section for performing processing to the image in said set available image area according to a discrimination result obtained from the feature discrimination section.

5. The image processing apparatus according to claim 4, wherein respective features with respect to a plurality of available image areas are discriminated by said feature discrimination section, discrimination results discriminated with respect to said plurality of available image areas are stored in a memory, respectively, a determination section for determining which discrimination result is used among the stored discrimination results is further provided, and processing according to the determined discrimination result is performed to the image in said available image area.

6. The image processing apparatus according to claim 3, wherein the classification of said pixel is discriminated on the basis of chromatic color or achromatic color of said pixel, a comparison section for comparing a difference between the numbers of pixels discriminated as chromatic with a predetermined value is further provided, and when the difference between the numbers of pixels discriminated chromatic is larger than said predetermined value, said image is discriminated as a chromatic image, whereas when said difference is smaller than said predetermined value, said image is discriminated as an achromatic image.

7. The image processing apparatus according to claim 4, wherein the classification of said each respective pixel is discriminated on the basis of chromatic color or achromatic color of said pixel, a comparison section for comparing a difference between the numbers of pixels discriminated as chromatic with a predetermined value is further provided, and when the difference between the numbers of pixels discriminated chromatic is larger than said predetermined value, said image is discriminated as a chromatic image, whereas when said difference is smaller than said predetermined value, said image is discriminated as an achromatic image.

8. The image processing apparatus according to claim 3, wherein the classification of said pixel is discriminated on the basis of a segmentation result indicating a component including at least a text component and a halftone component to which the pixel belongs, a comparison section for comparing whether a difference between the numbers of pixels for each component to which said pixel belongs is larger or smaller than a predetermined value for each component is further provided, wherein a document type is discriminated by extracting components where the difference between the numbers of pixels for each component is larger than the predetermined value for each component.

9. The image processing apparatus according to claim 4, wherein the classification of said each respective pixel is discriminated on the basis of a segmentation result indicating a component including at least a text component and a halftone component to which the pixel belongs, a comparison section for comparing a difference between the numbers of pixels for each component to which said pixel belongs with a predetermined value for each component is further provided, wherein a document type is discriminated by extracting components where the difference between the numbers of pixels for each component is larger than the predetermined value for each component.

10. The image processing apparatus according to claim 3, wherein the classification of said pixel is discriminated on the basis of a determination result of whether or not the pixel belongs to a page background component, a comparison section for comparing a difference between count numbers of the class to which said pixel belongs with a predetermined value is further provided, wherein the page background is discriminated based on a comparison result.

11. The image processing apparatus according to claim 4, wherein the classification of said each respective pixel is discriminated on the basis of a determination result of whether or not the pixel belongs to a page background component, a comparison section for comparing a difference between count numbers of the class to which said pixel belongs with a predetermined value is further provided, wherein the page background is discriminated based on a comparison result.

12. An image forming apparatus comprising:
the image processing apparatus according to claim 3; and
an image forming section for forming an image to which image processing is performed by the image processing apparatus, on a sheet.

13. An image forming apparatus comprising:
the image processing apparatus according to claim 4; and an image forming section for forming an image to which image processing is performed by the image processing apparatus, on a sheet.

14. A non-transitory computer-readable recording medium which a computer program for causing a computer to discriminate a classification of an image and perform processing according to a discrimination result is recorded, said computer program comprising the steps of:

causing the computer to calculate, from the line composed of a plurality of pixels, features of the pixels in the line;

causing the computer to discriminate a classification of the pixels based on the calculated features, and to count the pixels whose classifications are discriminated;

causing the computer to store the total number of pixels whose classifications are discriminated from a line of a read start position to respective lines in the image;

causing the computer to set an area to be processed with respect to the image;

causing the computer to calculate a difference between the total number of the pixels whose classifications are discriminated in respective lines from the line of the read start position to an end line in the set area, and the total number of the pixels whose classifications are discriminated in respective lines from the line of the read start position to a line just before the set area; and causing the computer to discriminate a classification of said set area based on the calculated difference, and to perform processing according to a discrimination result to the image in said set area.

* * * * *